United States Patent
Nagano et al.

(10) Patent No.: US 10,782,824 B2
(45) Date of Patent: Sep. 22, 2020

(54) TOUCH PANEL DISPLAY-MOUNTED TABLE

(71) Applicant: TOYOMARU SANGYO KABUSHIKI KAISHA, Nagoya-shi, Aichi (JP)

(72) Inventors: Mitsuyoshi Nagano, Nagoya (JP); Shoji Hirata, Nagoya (JP); Satoru Minoshima, Nagoya (JP)

(73) Assignee: TOYOMARU SANGYO KABUSHIKI KAISHA, Nagoya-shi (JP)

( * ) Notice: Subject to any disclaimer, the term of this patent is extended or adjusted under 35 U.S.C. 154(b) by 0 days.

(21) Appl. No.: 16/539,227

(22) Filed: Aug. 13, 2019

(65) Prior Publication Data

US 2019/0361566 A1 Nov. 28, 2019

Related U.S. Application Data

(63) Continuation of application No. PCT/JP2018/012345, filed on Mar. 27, 2018.

(30) Foreign Application Priority Data

Apr. 5, 2017 (JP) ................. 2017-075548

(51) Int. Cl.
*G06F 3/00* (2006.01)
*G06F 3/041* (2006.01)
*A47B 13/08* (2006.01)

(52) U.S. Cl.
CPC ............ *G06F 3/0416* (2013.01); *A47B 13/08* (2013.01); *A47B 2200/008* (2013.01)

(58) Field of Classification Search
CPC ....... A47B 21/04; A47B 21/007; A47B 21/06; A47B 13/12; A47B 13/08; A47B 96/206;
(Continued)

(56) References Cited

U.S. PATENT DOCUMENTS 5,680,820 A 10/1997 Randolph
6,237,507 B1 5/2001 Yanagisawa et al.
(Continued)

FOREIGN PATENT DOCUMENTS

DE 3934859 A1 7/1990
DE 19825356 A1 12/1999
(Continued)

OTHER PUBLICATIONS

CN 108041814; Shang H; abstract and figure (Year: 2018).*
(Continued)

*Primary Examiner* — Janet M Wilkens
(74) *Attorney, Agent, or Firm* — Oliff PLC

(57) ABSTRACT

A main control board is disposed in an accommodation space, is connected to an interactive display portion, and controls at least the interactive display portion. A power supply board is disposed in an accommodation space, is connected to the interactive display portion and the main control board, and supplies power to the interactive display portion and the main control board. A plug receiving portion is provided on a left plate which is one of a plurality of side plates, is connected to the power supply board, and has connected thereto by the attraction force of a magnet, a magnet-type plug of a magnetic cord that can be connected to an external power supply.

1 Claim, 19 Drawing Sheets

(58) Field of Classification Search
CPC ........ A47B 2021/064; A47B 2021/066; A47B 2200/008; A47B 2200/12; H05K 5/0217; H05K 5/0247; H05K 5/03; B01L 9/02; B01L 2200/0073; B01L 2200/025; B01L 2200/0689; G06F 3/0416
USPC ............ 108/50.01, 50.02, 25, 26; 312/223.3, 312/194–196, 7.2, 223.6
See application file for complete search history.

(56) References Cited

U.S. PATENT DOCUMENTS

| | | | | |
|---|---|---|---|---|
| 6,286,440 | B1* | 9/2001 | Jyringi | A47B 21/00 108/50.01 |
| 7,428,989 | B2 | 9/2008 | Abboud | G07F 17/3216 235/375 |
| 8,654,517 | B2* | 2/2014 | Aumiller | G06F 1/1637 108/50.01 |
| 9,612,006 | B2* | 4/2017 | Powell | F21V 33/0012 |
| 9,635,932 | B2* | 5/2017 | Kelley | A47B 21/06 |
| 9,690,396 | B1* | 6/2017 | Kubica | G06F 3/03545 |
| 9,781,996 | B1* | 10/2017 | Thompson | A47B 21/04 |
| 2002/0160629 | A1* | 10/2002 | Lau | H01R 13/4534 439/39 |
| 2010/0151953 | A1* | 6/2010 | Kuhn | A47B 25/00 473/15 |
| 2012/0105332 | A1* | 5/2012 | Aumiller | G06F 1/1601 345/173 |
| 2014/0299025 | A1* | 10/2014 | Moita Gorgulho Soares Branco | A47B 21/007 108/50.02 |
| 2015/0318638 | A1* | 11/2015 | McClelland | H01R 13/629 439/105 |
| 2016/0064854 | A1* | 3/2016 | Schooley | H01R 13/2421 439/39 |
| 2019/0377381 | A1* | 12/2019 | Tuttle | G06F 1/1656 |

FOREIGN PATENT DOCUMENTS

| | | |
|---|---|---|
| FR | 3018673 * | 3/2014 |
| JP | H08-314570 A | 11/1996 |
| JP | H09-234118 A | 9/1997 |
| JP | 2012-138030 A | 7/2012 |
| JP | 2013-003805 A | 1/2013 |
| JP | 2015-027336 A | 2/2015 |
| WO | 2014/034312 A1 | 3/2014 |
| WO | 2017189411 * | 11/2017 |

OTHER PUBLICATIONS

May 29, 2018 International Search Report issued in International Application No. PCT/JP2018/012345.
Oct. 8, 2019 International Preliminary Report on Patentability issued in International Application No. PCT/JP2018/012345.

* cited by examiner

TOUCH PANEL DISPLAY-MOUNTED TABLE

CROSS-REFERENCE TO RELATED APPLICATION

This application is a continuation application of International Application No. PCT/JP2018/012345, filed Mar. 27, 2018, which claims priority from Japanese Patent Application No. 2017-075548, filed on Apr. 5, 2017. The disclosure of the foregoing application is hereby incorporated by reference in its entirety.

BACKGROUND

The present disclosure relates to a touch panel display-mounted table.

In related art, a table on which a touch panel display is mounted is known. For example, in a table, an upper surface also functions as a touch panel. The touch panel is controlled by a computer and can realize various applications.

SUMMARY

In the table, the touch panel is connected to the computer and a power supply via a cord. Therefore, for example, if a user trips over the cord when the user moves around the table, risks may arise, such as a fall of the user, disconnection of the cord, and the like.

Various embodiments of the broad principles derived herein provide a touch panel display-mounted table that can suppress disconnection of a cord connected to the table, a fall of a user caused by the cord, and the like.

Embodiments provide a touch panel display-mounted table that includes a housing portion, a plurality of leg portions, an interactive display portion, an opening window, a control portion, a power supply portion, and a plug receiving portion. The housing portion has a bottom plate, a top plate disposed above the bottom plate and a plurality of side plates that couple the bottom plate and the top plate, and has a box shape inside which an accommodation space is formed. The housing portion extends in a first direction and in a second direction. The first direction is orthogonal to an up-down direction in which the bottom plate and the top plate face each other. The second direction is orthogonal to the up-down direction and the first direction. The plurality of leg portions support the housing portion from below. The interactive display portion is disposed in the accommodation space and has an interactive surface on which information is displayed and a touch operation of a user is performed. The opening window is an opening formed in the top plate and causes substantially the whole of the interactive surface to be exposed above the top plate. The control portion is disposed in the accommodation space and is connected to the interactive display portion. The control portion controls at least the interactive display portion. The power supply portion is disposed in the accommodation space and is connected to the interactive display portion and the control portion. The power supply portion supplies power to the interactive display portion and the control portion. The plug receiving portion is provided on one of the plurality of side plates and is connected to the power supply portion. A magnet type plug of a magnet cord connectable to an external power supply is connected to the plug receiving portion, using an attraction force of a magnet.

BRIEF DESCRIPTION OF DRAWINGS

Embodiments will be described below in detail with reference to the accompanying drawings in which.

DETAILED DESCRIPTION

Figure 1:
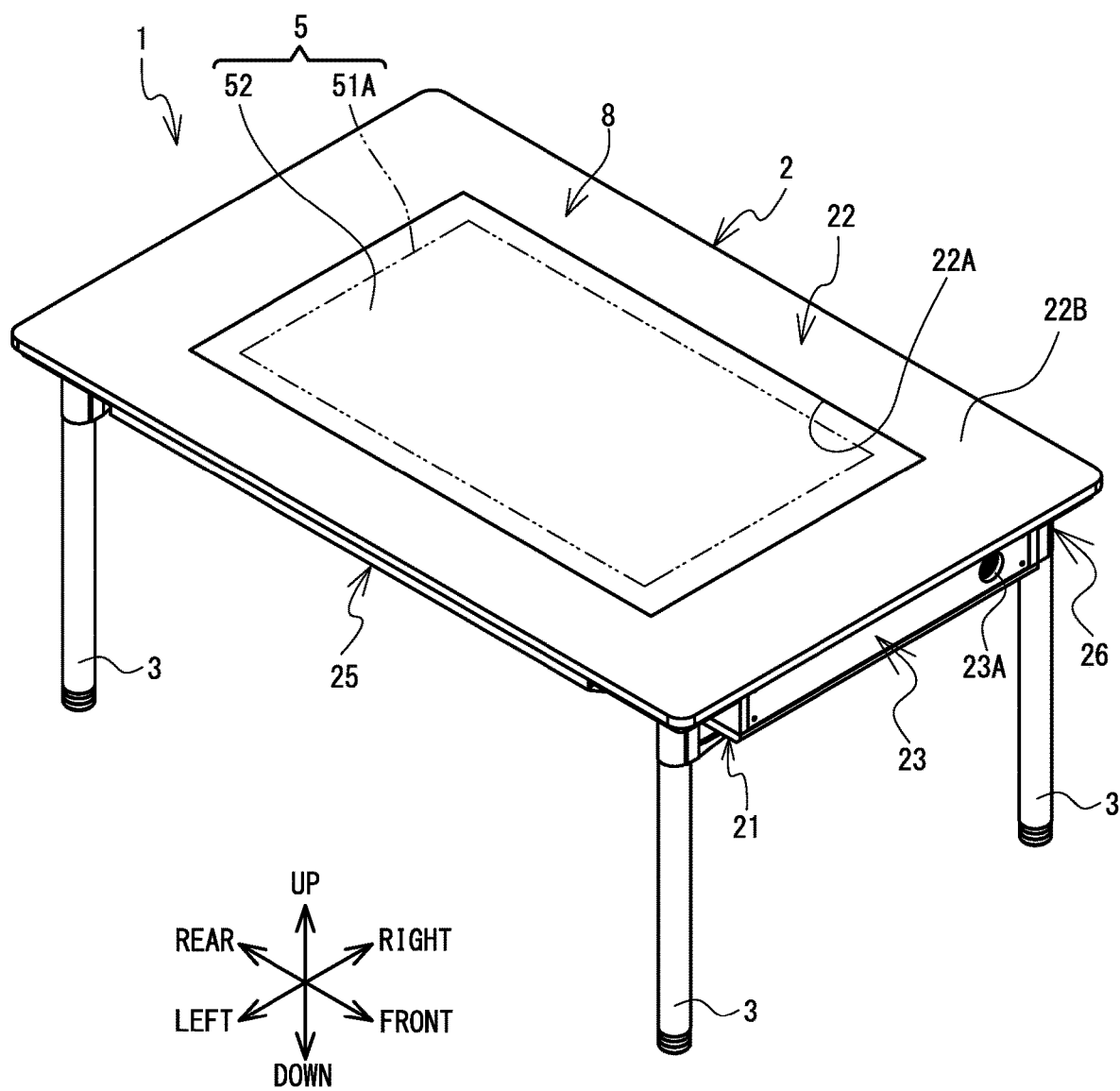
FIG. 1 is a perspective view of a table 1 as seen from the upper front left side.

A table 1 that is one embodiment of the present disclosure will be explained with reference to the drawings. In the explanation below, the upper side, the lower side, the lower right side, the upper left side, the lower left side and the upper right side in FIG. 1 are respectively defined as the upper side, the lower side, the front side, the rear side, the left side and the right side of the table 1.

An overview configuration of the table 1 will be explained with reference to FIG. 1. The table 1 is provided with a housing portion 2 in which an interactive display portion 5 and the like are provided, and a plurality of leg portions 3 that support the housing portion 2. In the same manner as a known touch panel display, the interactive display portion 5 has a display 51 (refer to FIG. 7) and a touch panel 52. The display 51 is disposed inside the housing portion 2. The touch panel 52 is disposed on the upper surface side of the housing portion 2. With the table 1, a person who sits at the table 1, for example, can visually check information displayed on the display 51 and can perform a touch operation via the touch panel 52.

A configuration of the housing portion 2 will be explained in detail with reference to FIG. 1 to FIG. 4 and FIG. 6. The housing portion 2 has, as a whole, a box shape which extends in the front-rear direction and the left-right direction and which is thick in the up-down direction. The housing portion 2 has a bottom plate 21 and a top plate 22 that face each other in the up-down direction, a front plate 23 and a rear plate 24 that face each other in the front-rear direction, and a left plate 25 and a right plate 26 that face each other in the left-right direction. The front plate 23, the rear plate 24, the left plate 25 and the right plate 26 are a plurality of side plates that couple the bottom plate 21 and the top plate 22.

As shown in FIG. 1, the bottom plate 21 has a rectangular plate shape that extends in the front-rear direction and the left-right direction. The top plate 22 is disposed above the bottom plate 21 and has a rectangular plate shape that extends in the front-rear direction and the left-right direction. A long side direction and a short side direction of the bottom plate 21 and the top plate 22 are, respectively, the front-rear direction and the left-right direction. The length of the top plate 22 in the front-rear direction is slightly greater than the length of the bottom plate 21 in the front-rear direction. The length of the top plate 22 in the left-right direction is greater than the length of the bottom plate 21 in the left-right direction. Therefore, the top plate 22 extends further to both sides in the left-right direction than the bottom plate 21.

The top plate 22 is provided with an opening window 22A that penetrates the top plate 22 in the up-down direction. The opening window 22A has a rectangular shape that corresponds to the touch panel 52. The long side direction and the short side direction of the opening window 22A are, respectively, the front-rear direction and the left-right direction. Of the upper surface of the top plate 22, a rectangular frame-shaped region that covers the periphery of the opening window 22A is a table surface 22B.

A surface cover 8 is provided so as to cover the entire upper surface of the top plate 22. The surface cover 8 has a thin plate shape that is formed of three layers including a protective layer 81, a cover glass 82 and an anti-scatter layer 83 (refer to FIG. 15). The cover glass 82 is laminated on the upper surface of the anti-scatter layer 83 using a transparent adhesive. The protective layer 81 is laminated on the upper surface of the cover glass 82 using the transparent adhesive. The transparent adhesive is, for example, a transparent acrylic adhesive.

The cover glass 82 is a reinforced glass that forms a main body of the surface cover 8, and has a thickness of 4 mm, for example. The protective layer 81 and the anti-scatter layer 83 each have a film shape that is formed of polyethylene terephthalate (PET), for example. The protective layer 81 is a coating layer on which anti-stain/anti-fingerprint processing is performed and which covers the surface of the cover glass 82, and has a thickness of 125 μm, for example. The anti-scatter layer 83 covers the bottom surface of the cover glass 82. The anti-scatter layer 83 is a coating layer to inhibit scatter caused by damage to the cover glass 82, and has a thickness of 100 μm, for example. Using the transparent adhesive, the anti-scatter layer 83 is bonded to the table surface 22B and to the touch panel 52 disposed inside the opening window 22A.

Figure 4:
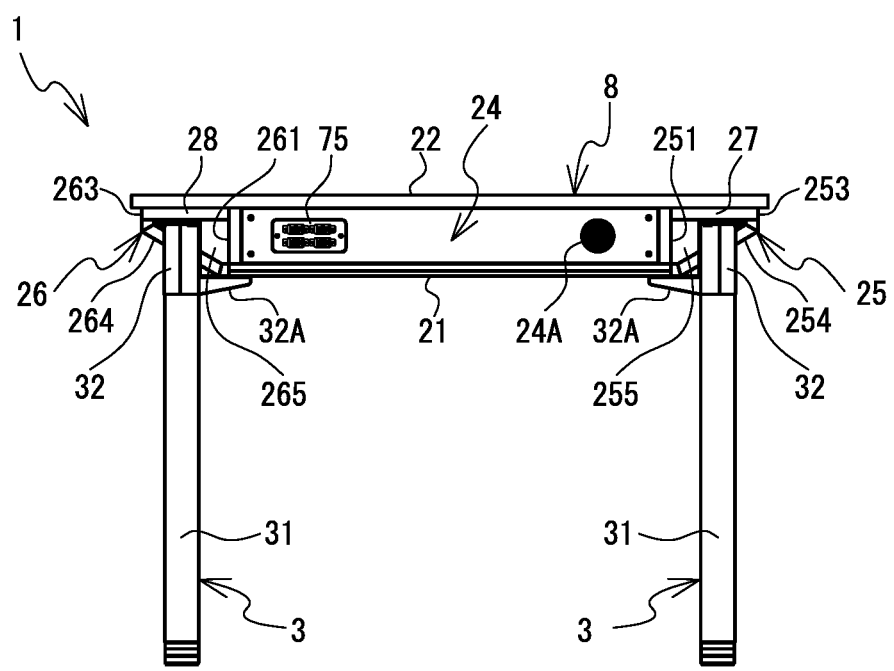
FIG. 4 is a back view of the table 1.
Figure 4:
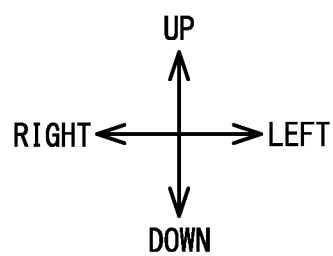

As shown in FIG. 1 and FIG. 4, the front plate 23 and the rear plate 24 have the same size and shape as each other, and have a rectangular plate shape that extends in the left-right direction and the up-down direction. The long side direction and the short side direction of the front plate 23 and the rear plate 24 are, respectively, the left-right direction and the up-down direction. The front plate 23 and the rear plate 24 extend vertically from the bottom plate 21 to the top plate 22 along the front end side and the rear end side of the bottom plate 21, respectively.

A circular opening 23A that penetrates the front plate 23 in the front-rear direction is provided in the vicinity of the right end portion of the front plate 23. A circular opening 24A that penetrates the rear plate 24 in the front-rear direction is provided in the vicinity of the left end portion of the rear plate 24. A third interface 75 to connect with an external device is provided in the vicinity of the right end portion of the rear plate 24. The third interface 75 of the present embodiment has universal serial bus connection portions (so-called ports) of a plurality of different standards, and has three USB 2.0 ports and three USB 3.0 ports, for example. Note that the third interface 75 can be opened and closed by a cover not shown in the drawings.

Figure 2:
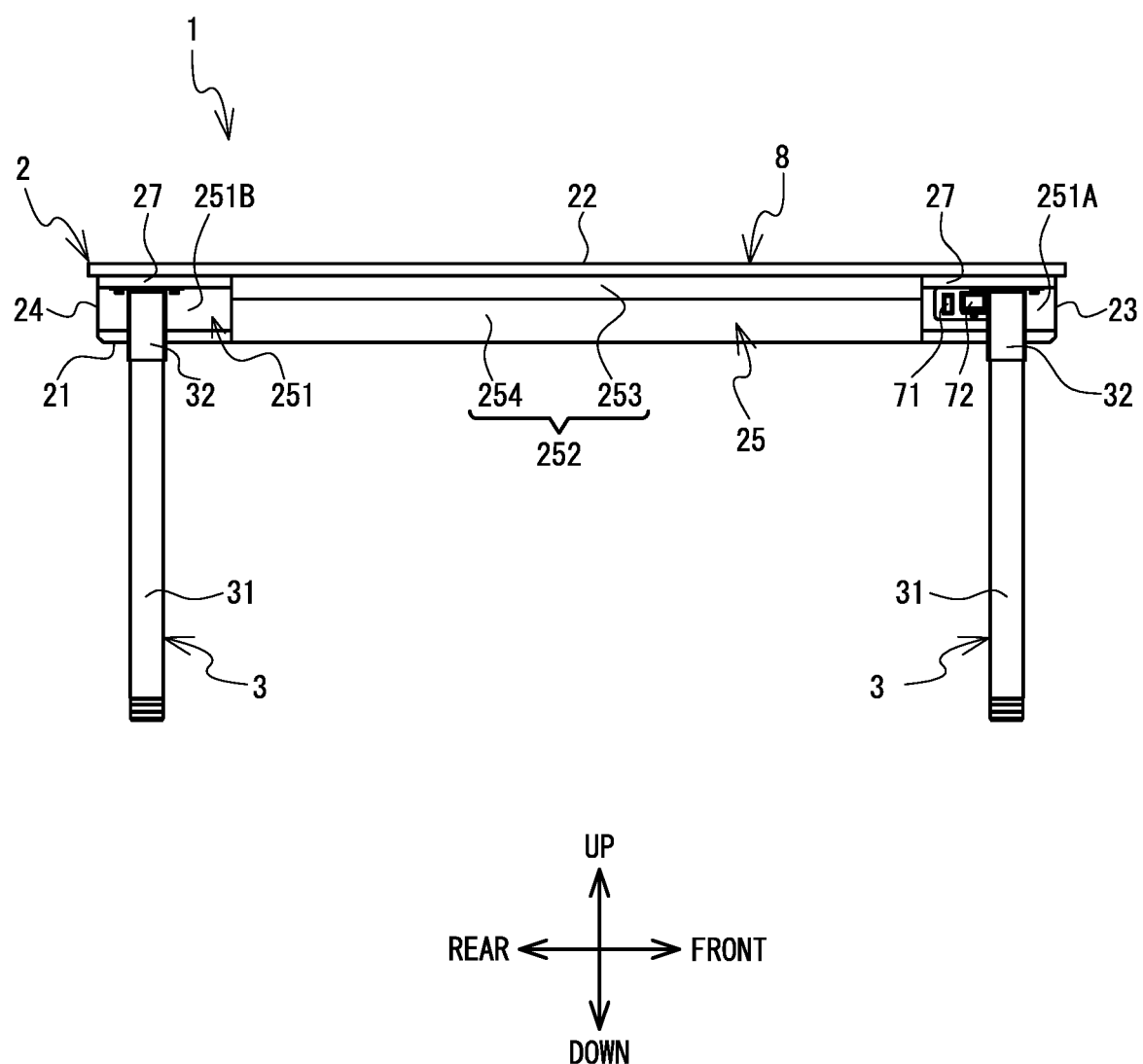
FIG. 2 is a left side view of the table 1.
Figure 3:
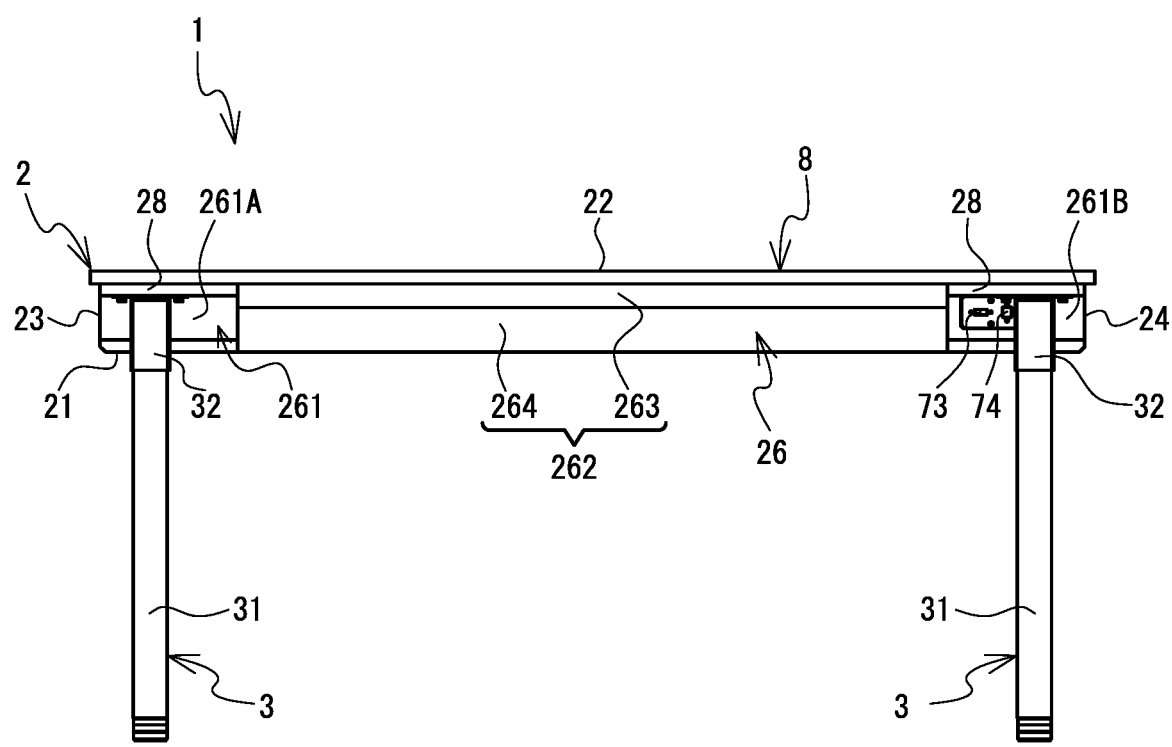
FIG. 3 is a right side view of the table 1.
Figure 3:
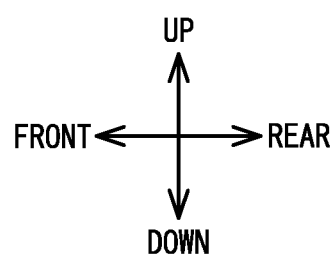
Figure 6:
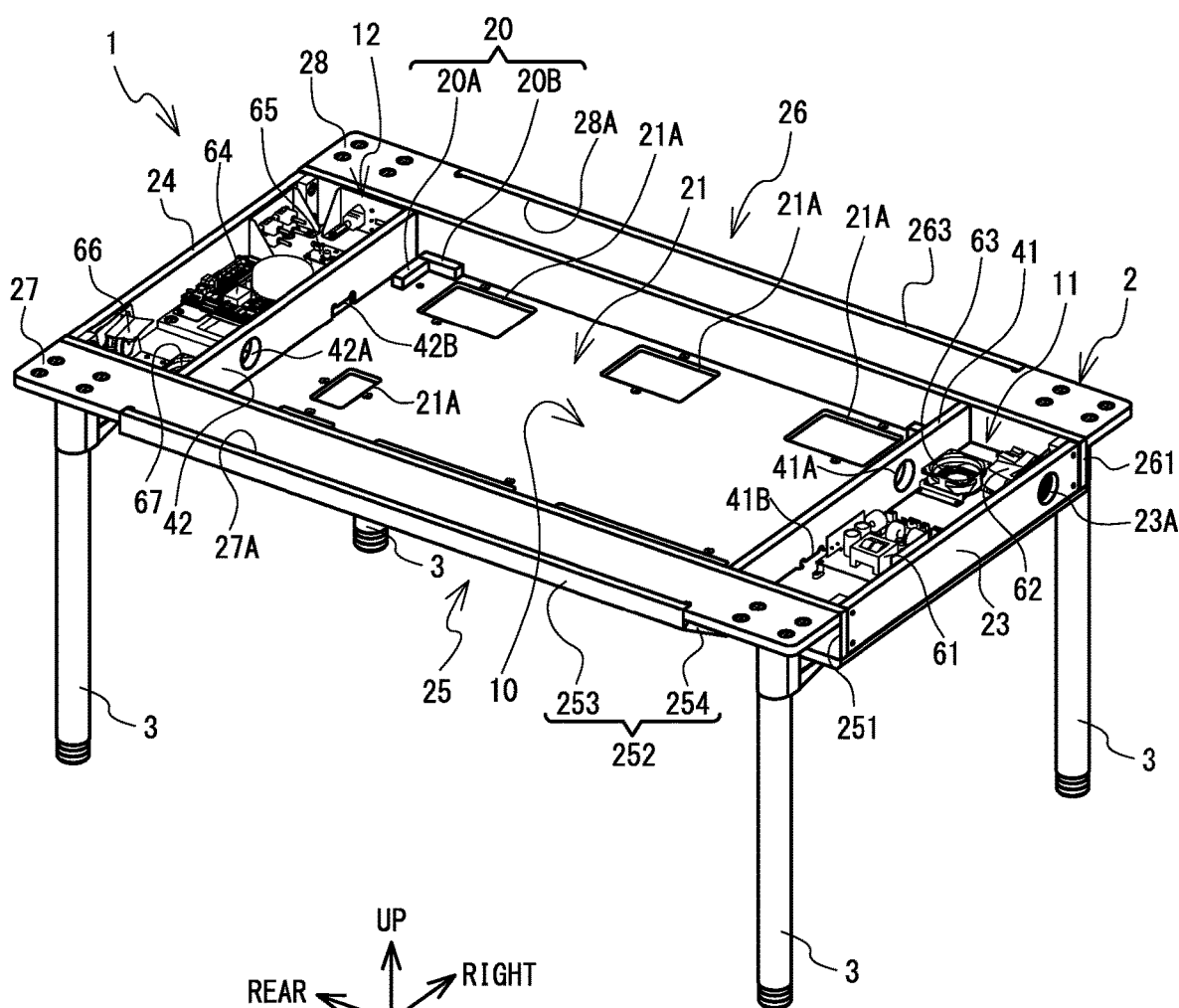
FIG. 6 is a perspective view of the table 1 as seen from the upper front left side when the interactive display portion 5 and a top plate 22 are removed.

As shown in FIG. 2 and FIG. 3, the left plate 25 and the right plate 26 are provided left-right symmetrically, and are plate-shaped members having the same shape and size as each other. As shown in FIG. 2 and FIG. 6, the left plate 25 has a coupling plate 251 and a protective plate 252. The coupling plate 251 has a rectangular plate shape that extends in the front-rear direction and the up-down direction. The long side direction and the short side direction of the coupling plate 251 are, respectively, the front-rear direction and the up-down direction. The end portions of the coupling plate 251 in the front-rear direction are respectively coupled to the front plate 23 and the rear plate 24. The coupling plate 251 extends vertically from the bottom plate 21 to the top plate 22 along the left end side of the bottom plate 21. The coupling plate 251 passes slightly to the left of the opening window 22A (refer to FIG. 1) and extends in the front-rear direction.

A support plate 27 extends in the leftward direction from the coupling plate 251 along the upper end side of the coupling plate 251. The support plate 27 has a rectangular plate shape that extends in the front-rear direction and the left-right direction. The long side direction and the short side direction of the support plate 27 are, respectively, the front-rear direction and the left-right direction. The left end side of the support plate 27 is located slightly to the right of the left end side of the top plate 22 (refer to FIG. 4). A recessed portion 27A is provided in the support plate 27. The recessed portion 27A is a section that is slightly recessed to the right from the left surface of the support plate 27. The recessed portion 27A straddles the center of the support plate 27 in the front-rear direction and extends in the front-rear direction. The recessed portion 27A of the present embodiment extends at least more than the opening window 22A to both sides in the front-rear direction.

Figure 8:
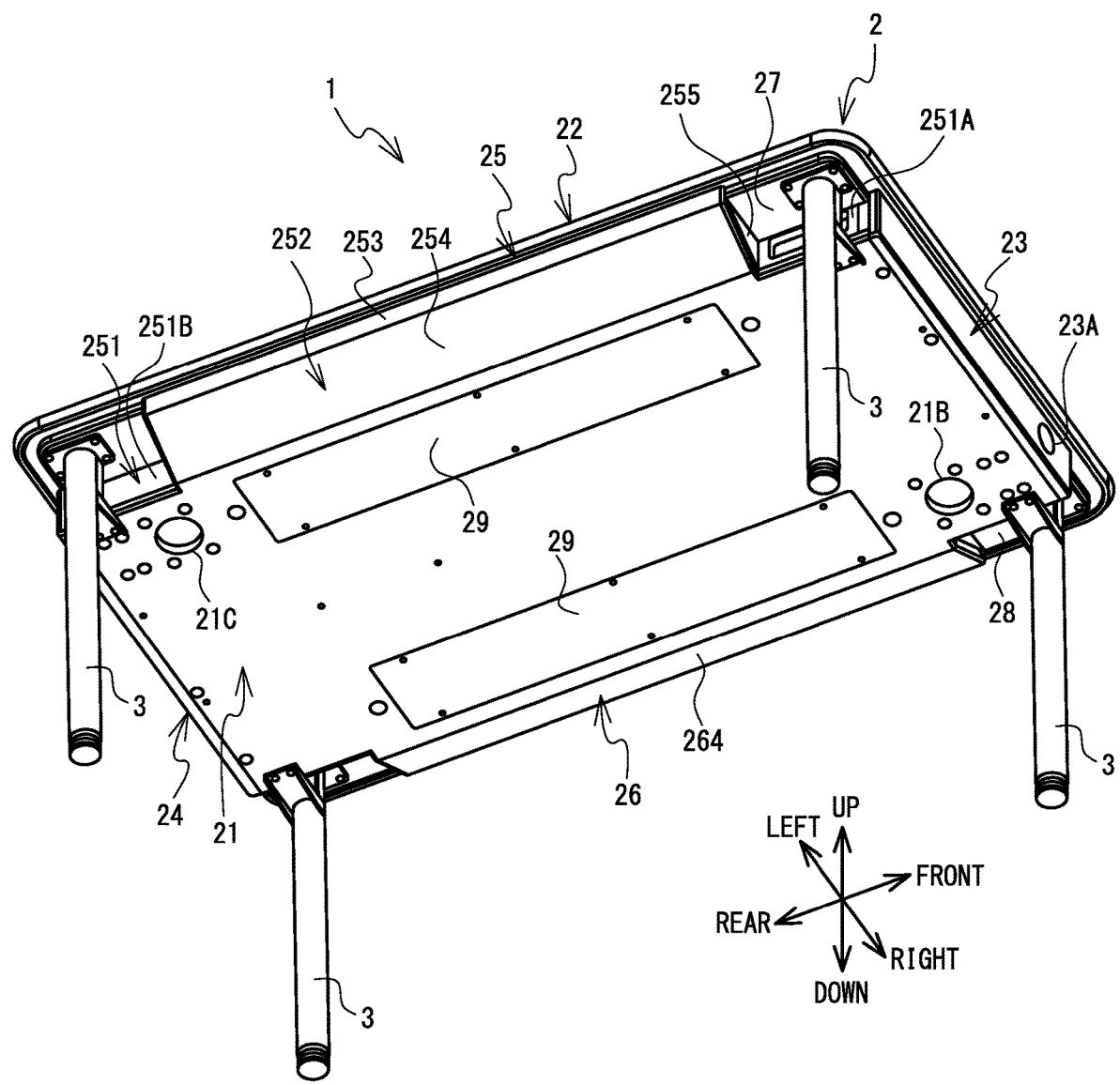
FIG. 8 is a perspective view of the table 1 as seen from the lower front left side.

The protective plate 252 is a plate-shaped member that covers a part of the coupling plate 251 from the left side, and has a vertical surface 253, an inclined surface 254 and a pair of blocking surfaces 255 (refer to FIG. 4 and FIG. 8). The vertical surface 253 is fitted into the recessed portion 27A in the front-rear direction, and is a rectangular plate-shaped portion which is long in the front-rear direction and which extends vertically so as to slightly protrude in the downward direction from the recessed portion 27A. The inclined surface 254 is a rectangular plate-shaped portion which is long in the front-rear direction and which extends downward and rightward from the lower end of the vertical surface 253. The lower end of the inclined surface 254 is connected to the left surface of the bottom plate 21. In other words, the inclined surface 254 extends from the left end side of the top plate 22 to the left end side of the bottom plate 21, and as it extends toward the left end side of the bottom plate 21, it inclines toward the inside of the housing portion 2. When seen along the up-down direction, the whole of the inclined surface 254 is aligned with the opening window 22A in the left-right direction.

The pair of blocking surfaces 255 are substantially triangular plate-shaped portions that extend upward from the inclined surface 254, at both end portions of the protective plate 252 in the front-rear direction. The pair of blocking surfaces 255 are in contact with the support plate 27 and the coupling plate 251, and thus block both the end portions of the protective plate 252 in the front-rear direction.

As shown in FIG. 2, a section of the coupling plate 251 that is located to the front of the protective plate 252 is a first surface 251A, and a section of the coupling plate 251 that is located to the rear of the protective plate 252 is a second surface 251B. The first surface 251A is provided with a power supply switch 71 and a plug receiving portion 72. The power supply switch 71 is a switch to switch on/off the power supply of the table 1. The plug receiving portion 72 is a connector that is connected, using an attraction force of a magnet, to a magnet type plug 4A (refer to FIG. 11) of a magnet cord 4 that is connectable to an external power supply. The plug receiving portion 72 has a structure similar to that of a known plug receiving portion to which a magnet type plug is connected, and which is used for an electrical appliance, such as an electric pot, a hot plate or the like, for example.

As shown in FIG. 3 and FIG. 6, the right plate 26 has a structure similar to that of the left plate 25, and has a coupling plate 261 and a protective plate 262. The end portions of the coupling plate 261 in the front-rear direction are respectively coupled to the front plate 23 and the rear plate 24. The coupling plate 261 extends vertically from the bottom plate 21 to the top plate 22 along the right end side of the bottom plate 21. The coupling plate 261 passes slightly to the right of the opening window 22A (refer to FIG. 1) and extends in the front-rear direction.

A support plate 28 has a structure similar to that of the support plate 27, and extends in the rightward direction from the coupling plate 261 along the upper end side of the coupling plate 261. The right end side of the support plate 28 is located slightly to the left of the right end side of the top plate 22 (refer to FIG. 4). A recessed portion 28A is provided in the support plate 28. The recessed portion 28A is a section that is slightly recessed to the left from the right surface of the support plate 28. The recessed portion 28A straddles the center of the support plate 28 in the front-rear direction and extends in the front-rear direction. The recessed portion 28A of the present embodiment extends at least more than the opening window 22A to both sides in the front-rear direction, so as to be left-right symmetric with the recessed portion 27A.

The protective plate 262 is a plate-shaped member that covers a part of the coupling plate 261 from the right side. The protective plate 262 has a structure similar to that of the protective plate 252, and has a vertical surface 263, an inclined surface 264 and a pair of blocking surfaces 265 (refer to FIG. 4). The vertical surface 263 is fitted into the recessed portion 28A in the front-rear direction, and extends vertically so as to slightly protrude in the downward direction from the recessed portion 28A. The inclined surface 264 extends downward and leftward from the lower end of the vertical surface 263. The lower end of the inclined surface 264 is connected to the right surface of the bottom plate 21. In other words, the inclined surface 264 extends from the right end side of the top plate 22 to the right end side of the bottom plate 21, and as it extends toward the right end side of the bottom plate 21, it inclines toward the inside of the housing portion 2. When seen along the up-down direction, the whole of the inclined surface 264 is aligned with the opening window 22A in the left-right direction. The pair of blocking surfaces 265 are substantially triangular plate-shaped portions that block both end portions of the protective plate 262 in the front-rear direction.

As shown in FIG. 3, a section of the coupling plate 261 that is located to the front of the protective plate 262 is a first surface 261A, and a section of the coupling plate 261 that is located to the rear of the protective plate 262 is a second surface 261B. The second surface 261B is provided with a first interface 73 to connect to an external network, and a second interface 74 to output a signal to an external device. The first interface 73 of the present embodiment is a LAN port to which is connected a cable to connect to a local area network. The second interface 74 of the present embodiment is an HDMI (registered trademark) port to which is connected a cable to transmit a digital signal using a high-definition multimedia interface. Note that the first interface 73 and the second interface 74 can be opened and closed by a cover not shown in the drawings.

An internal structure of the housing portion 2 will be explained with reference to FIG. 5 to FIG. 7. An interior space, which is surrounded by the bottom plate 21, the top plate 22, the front plate 23, the rear plate 24 and the coupling plates 251 and 261, is formed inside the housing portion 2. Partition plates 41 and 42 are provided in the interior space of the housing portion 2. Each of the partition plates 41 and 42 extends vertically from the bottom plate 21 to the top plate 22, and extends in the left-right direction between the coupling plates 251 and 261. The partition plate 41 passes slightly to the front of the opening window 22 (refer to FIG. 1) and extends in the left-right direction. The partition plate 42 passes slightly to the rear of the opening window 22A and extends in the left-right direction.

Figure 5:
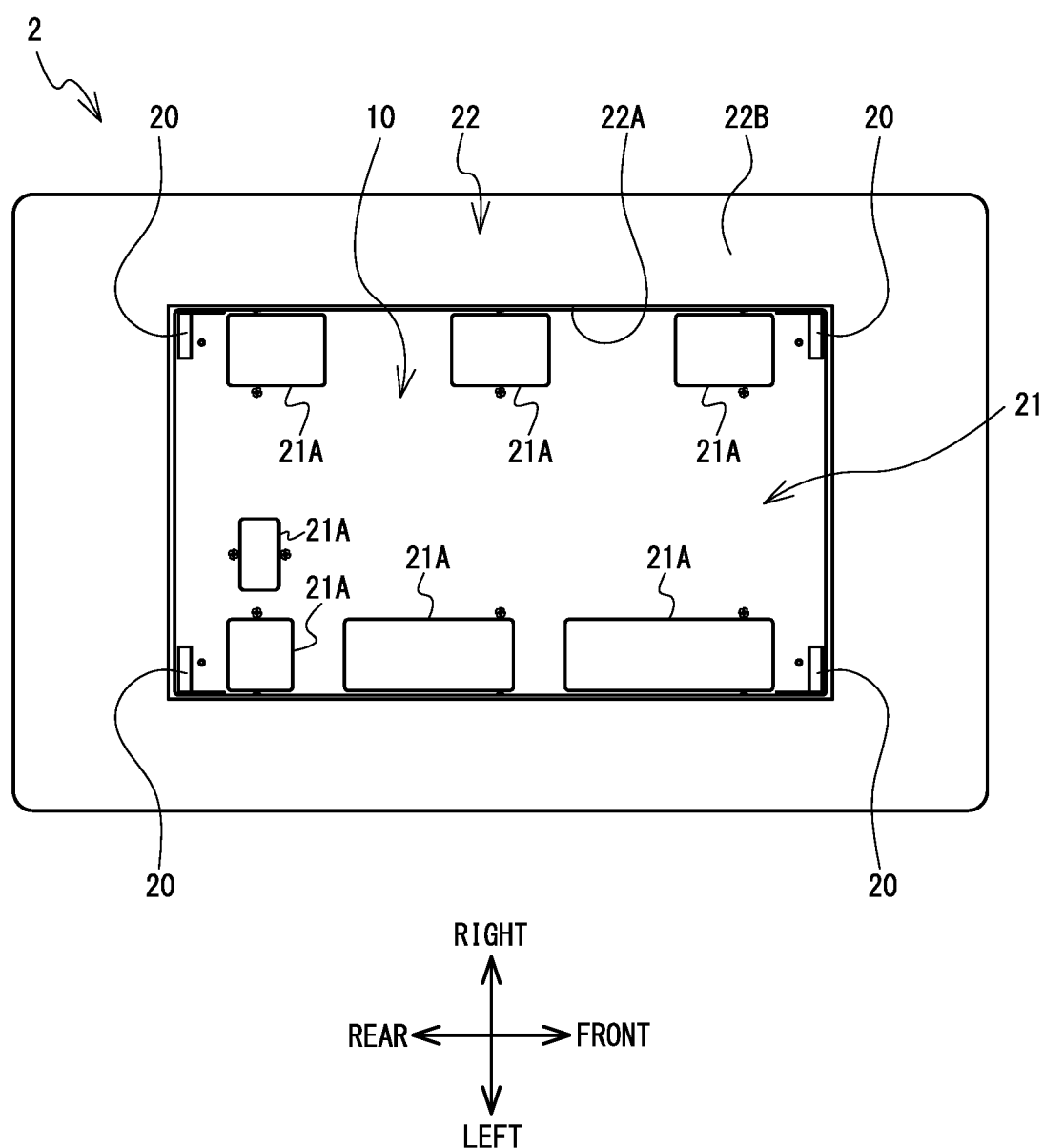
FIG. 5 is a plan view of the table 1 when an interactive display portion 5 is removed.

As shown in FIG. 5 and FIG. 6, the interior space of the housing portion 2 is partitioned into three accommodation spaces 10 to 12 by the partition plates 41 and 42. The accommodation space 10 is exposed above the top plate 22 via the opening window 22. The bottom plate 21 is provided with a plurality of opening portions 21A that cause the accommodation space 10 to be exposed below the bottom plate 21. In the present embodiment, three of the opening portions 21A are provided in a right half region of the accommodation space 10, and four of the opening portions 21A are provided in a left half region of the accommodation space 10. Four support portions 20 are provided at four corners of the accommodation space 10. Each of the support portions 20 is provided on the upper surface of the bottom plate 21, and is an L-shaped member following a shape of a corresponding corner portion. Each of the support portions 20 has a plate-shaped elastic body 20A that extends in the left-right direction, and a plate-shaped elastic body 20B that extends in the front-rear direction.

The accommodation space 11 is provided to the front of the accommodation space 10, and is covered by the top plate 22 from above. A front right section of the bottom plate 21 is provided with a circular opening portion 21B (refer to FIG. 8) that causes the accommodation space 11 to be exposed below the bottom plate 21. A right-side section of the partition plate 41 is provided with a circular ventilation hole 41A that penetrates the partition plate 41 in the front-rear direction. The lower end portion of a left-side section of the partition plate 41 is provided with a slit-shaped wiring hole 41B that penetrates the partition plate 41 in the front-rear direction. The accommodation space 11 is communicated with the accommodation space 10 via the ventilation hole 41A and the wiring hole 41B.

The accommodation space 12 is provided to the rear of the accommodation space 10, and is covered by the top plate 22 from above. A rear left section of the bottom plate 21 is provided with a circular opening portion 21C (refer to FIG. 8) that causes the accommodation space 12 to be exposed below the bottom plate 21. A left-side section of the partition plate 42 is provided with a circular ventilation hole 42A that penetrates the partition plate 42 in the front-rear direction. The lower end portion of a right-side section of the partition plate 42 is provided with a slit-shaped wiring hole 42B that penetrates the partition plate 42 in the front-rear direction. The accommodation space 12 is communicated with the accommodation space 10 via the ventilation hole 42A and the wiring hole 42B.

Figure 7:
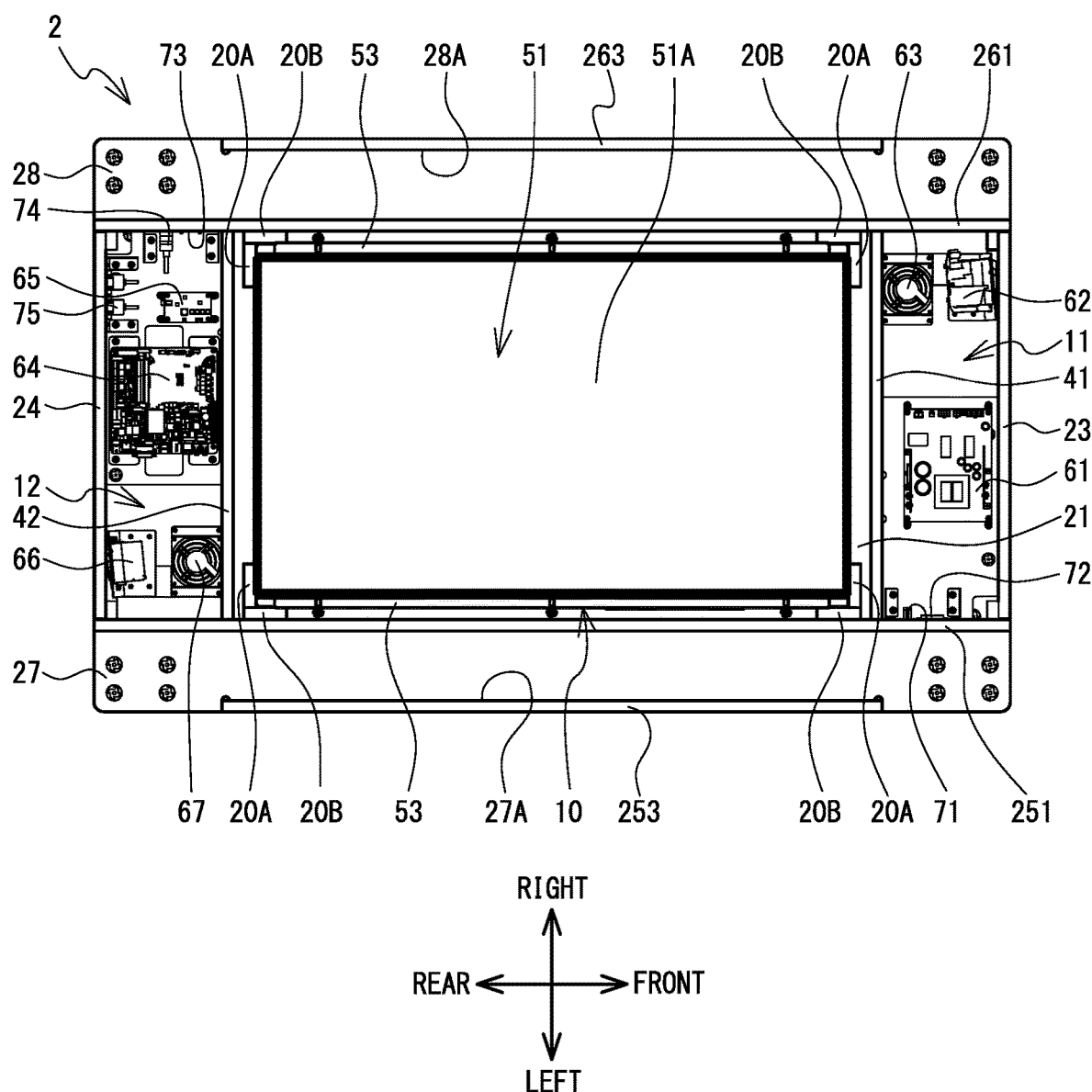
FIG. 7 is a plan view of the table 1 when the top plate 22 is removed.

As shown in FIG. 7, in the same manner as the known touch panel display, the interactive display portion 5 (refer to FIG. 1) is formed by layering the touch panel 52 on a display surface 51A of the display 51. The display 51 of the present embodiment is a liquid crystal display having the rectangular large-sized (42-inch, for example) display surface 51A. A method that can detect simultaneous touches of a plurality of points (10 points, for example) is suitable for a detection method of the touch operation on the touch panel 52. In the touch panel 52 of the present embodiment, an electrode pattern layer and a cover layer are provided on a glass substrate, and the touch operation is detected using a known projected capacitance method.

The display 51 is disposed in the accommodation space 10 in a state in which the display surface 51A is directed upward. At this time, the long side direction and the short side direction of the display surface 51A are, respectively, the front-rear direction and the left-right direction. Four corners of the display 51 are each placed on the upper side of the corresponding elastic body 20A. Thus, the display 51 is supported, from below, by the four elastic bodies 20A at positions slightly separated upward from the bottom plate 21. Further, clamping plates 53 are respectively fixed to both the left and right surfaces of the display 51. The clamping plate 53 of the left surface comes into contact with the two elastic bodies 20B on the left side, from the right side. The clamping plate 53 of the right surface comes into contact with the two elastic bodies 20B on the right side, from the left side. Thus, the position of the display 51 is determined by the four elastic bodies 20B via the two clamping plates 53.

In a state in which the display 51 is disposed in the accommodation space 10 as described above, the touch panel 52 is fitted into the opening window 22A without a gap. At this time, the upper surface of the touch panel 52 is substantially flush with the table surface 22B.

As shown in FIG. 6 and FIG. 7, a power supply board 61, a speaker 62 and a fan 63 are disposed in the accommodation space 11. The power supply board 61 is provided to the front of the wiring hole 41B, and is connected to the plug receiving portion 72 via a cable (not shown in the drawings). Electric power supplied from the external power supply is transmitted to the power supply board 61 via the plug receiving portion 72. The speaker 62 is provided to the rear of the opening 23A, and outputs audio to the outside of the housing portion 2 via the opening 23A. The fan 63 is provided above the opening portion 21B (refer to FIG. 8), and discharges air that has become warmed inside the housing portion 2 to the outside of the housing portion 2 via the opening portion 21B.

A main control board 64, an amplifier board 65, a speaker 66 and a fan 67 are disposed in the accommodation space 12. The main control board 64 is an electronic circuit board that performs control and the like of the interactive display portion 5, and is provided to the rear of the wiring hole 42B. The amplifier board 65 is an electronic circuit board that amplifies an audio signal to be output to the speakers 62 and 66, and is provided on the right side of the main control board 64. The speaker 66 is provided to the front of the opening 24A (refer to FIG. 4), and outputs audio to the outside of the housing portion 2 via the opening 24A. The fan 67 is provided above the opening portion 21C (refer to FIG. 8), and discharges the air that has become warmed inside the housing portion 2 to the outside of the housing portion 2 via the opening portion 21C.

The power supply board 61, the fan 63 and the power supply switch 71 are connected to the main control board 64 by wiring lines not shown in the drawings. More specifically, the plurality of wiring lines that are respectively connected to the power supply board 61, the fan 63 and the power supply switch 71 are pulled out from the accommodation space 11 to the accommodation space 10 via the wiring hole 41B, and extend in the rearward direction passing below the display 51. Further, the plurality of wiring lines are pulled out from the accommodation space 10 to the accommodation space 12 via the wiring hole 42B, and are connected to the main control board 64. In the same manner, the speaker 62 is connected to the amplifier board 65 via the wiring holes 41B and 42B by wiring lines not shown in the drawings.

Further, the power supply board 61 is connected to the interactive display portion 5 by a wiring line not shown in the drawings. Mores specifically, the wiring line connected to the power supply board 61 is pulled out from the accommodation space 11 to the accommodation space 10 via the wiring hole 41B, and is connected to the interactive display portion 5. The interactive display portion 5 is connected to the main control board 64 by a wiring line not shown in the drawings. More specifically, the wiring line connected to the interactive display portion 5 extends in the rearward direction passing below the display 51, is pulled out from the accommodation space 10 to the accommodation space 12 via the wiring hole 42B, and is connected to the main control board 64.

Inside the accommodation space 12, the amplifier board 65, the fan 67, the first interface 73, the second interface 74 and the third interface 75 are connected to the main control board 64 by wiring lines not shown in the drawings. In the same manner, in the accommodation space 12, the speaker 66 is connected to the amplifier board 65 by a wiring line not shown in the drawings.

Thus, the power supply board 61 can supply power to the main control board 64 and the interactive display portion 5. The main control board 64 receives the supply of the power from the power supply board 61 and can thus control various operations. For example, the main control board 64 can control information display and the touch operation of the interactive display portion 5, audio output of the speakers 62 and 66 via the amplifier board 65, connection with an external device and an external network via various interfaces, and the like.

As shown in FIG. 8, using screws, two rectangular plate-shaped covers 29 can be attached to and detached from the lower surface of the bottom plate 21. The left-side plate-shaped cover 29 covers the four opening portions 21A provided in the left half region of the accommodation space 10 from below. The right-side plate-shaped cover 29 covers the three opening portions 21A provided in the right half region of the accommodation space 10 from below. For example, when operations are performed, such as maintenance of the interactive display portion 5, routing of the various wiring lines, and the like, a user can remove the two rectangular plate-shaped covers 29 and can thus easily perform the operations via the plurality of opening portions 21A.

The structure of the plurality of leg portions 3 will be explained in detail with reference to FIG. 1 to FIG. 4, FIG. 6 and FIG. 8. A shown in FIG. 1 to FIG. 4, the plurality of leg portions 3 are a plurality of columnar bodies which extend downward from both end portions of the housing portion 2 in the front-rear direction, and which support the housing portion 2 from below. In the present embodiment, four of the leg portions 3 extend downward from four corners of the housing portion 2. Each of the leg portions 3 has a columnar portion 31 and a coupling portion 32. The columnar portion 31 has a cylindrical shape that extends in the up-down direction. The coupling portion 32 is a metal fitting for coupling that is provided on the upper end portion of the columnar portion 31, and has a protruding portion 32A that protrudes in a direction orthogonal to the up-down direction.

As shown in FIG. 6 and FIG. 8, the top plate 22 is provided on the upper side of each of the front plate 23, the rear plate 24, the coupling plates 251 and 261, the partition plates 41 and 42, and the support plates 27 and 28. In the interior space of the housing portion 2, the partition plates 41 and 42 support the top plate 22 from below in the vicinity of the opening window 22A (refer to FIG. 1).

As shown in FIG. 2, in the leg portion 3 on the front left side, the coupling portion 32 is disposed on the left side of the first surface 251A and is fixed to the lower surface of the top plate 22 via the support plate 27 using screws. Further, in the leg portion 3 on the front left side, the protruding portion 32A protrudes to the right and is fixed to the lower surface of the bottom plate 21 using screws. Note that, in the front-rear direction, the power supply switch 71 and the plug receiving portion 72 are located between the protective plate 252 and the coupling portion 32 on the front left side. In the same manner, in the leg portion 3 on the rear left side, the coupling portion 32 is disposed on the left side of the second surface 251B and is fixed to the lower surface of the top plate 22 via the support plate 27, and the protruding portion 32A is fixed to the lower surface of the bottom plate 21.

As shown in FIG. 3, in the leg portion 3 on the rear right side, the coupling portion 32 is disposed on the right side of the second surface 261B and is fixed to the lower surface of the top plate 22 via the support plate 27 using screws. Further, in the leg portion 3 on the rear right side, the protruding portion 32A protrudes to the left and is fixed to the lower surface of the bottom plate 21 using screws. Note that, in the front-rear direction, the first interface 73 and the second interface 74 are located between the protective plate 262 and the coupling portion 32 on the rear right side. In the same manner, in the leg portion 3 on the front right side, the coupling portion 32 is disposed on the right side of the first surface 261A and is fixed to the lower surface of the top plate 22 via the support plate 27, and the protruding portion 32A is fixed to the lower surface of the bottom plate 21.

As explained above, according to the table 1 of the present embodiment, the housing portion 2 has the bottom plate 21, the top plate 22 disposed above the bottom plate 21, and the plurality of side plates (the front plate 23, the rear plate 24, the left plate 25 and the right plate 26) that couple the bottom plate 21 and the top plate 22, and has a box shape in which the accommodation spaces 10 to 12 are formed. The housing portion 2 extends in the front-rear direction that is orthogonal to the up-down direction in which the bottom plate 21 and the top plate 22 face each other, and in the left-right direction that is orthogonal to the up-down direction and the front-rear direction. The plurality of leg portions 3 support the housing portion 2 from below. The interactive display portion 5 is disposed in the accommodation space 10, and has an interactive surface (the display surface 51A and the touch panel 52) on which information is displayed and the touch operation of the user is performed. The opening window 22A is an opening formed in the top plate 22, and causes substantially the whole of the interactive surface to be exposed above the top plate 22.

The main control board 64 is disposed in the accommodation space 12 and is connected to the interactive display portion 5. The main control board 64 controls at least the interactive display portion 5. The power supply board 61 is disposed in the accommodation space 11 and is connected to the interactive display portion 5 and the main control board 64. The power supply board 61 supplies power to the interactive display portion 5 and the main control board 64. The plug receiving portion 72 is provided on the left plate 25, which is one of the plurality of side plates, and is connected to the power supply board 61. The magnet type plug 4A of the magnet cord 4 that is connectable to the external power supply is connected to the plug receiving portion 72 by the attraction force of the magnet.

With this configuration, for example, if the user trips over the magnet cord 4 when the user moves around the table 1, the magnet type plug is easily removed from the plug receiving portion 72 by that impact. Therefore, for example, even when the user trips over the magnet cord 4, risks that may cause a fall of the user, breakage of the magnet cord 4, and the like, are suppressed. It is thus possible to improve the safety of the table 1.

The plurality of side plates include the left plate 25 and the right plate 26 which extend in the front-rear direction and which face each other in the left-right direction, and the front plate 23 and the rear plate 24 which extend in the left-right direction and which face each other in the front-rear direction. The left plate 25 includes the inclined surface 254 that extends in a direction that intersects the up-down direction. The inclined surface 254 extends from the left end side of the top plate 22 to the left end side of the bottom plate 21, and as it extends toward the left end side of the bottom plate 21, it inclines toward the inside of the housing portion 2. When seen along the up-down direction, at least a part of the inclined surface 254 is aligned with at least a part of the opening window 22A in the left-right direction. In the present embodiment, when seen along the up-down direction, the whole of the inclined surface 254 is aligned with the opening window 22A in the left-right direction.

When the user uses the interactive display portion 5, the user sits at the table 1, in a position that is aligned with the opening window 22A in the left-right direction. If the inclined surface 254 is not provided in the table 1, when the user sits at the table 1 from the left plate 25 side, the user's chest or abdomen may come into contact with the left end portion of the top plate 22, and this may cause pain or injury to the user. According to the present embodiment, when the user sits at the table 1 from the left plate 25 side, the user's chest or abdomen faces the inclined surface 254. Therefore, the user's chest or abdomen does not easily come into contact with the left end portion of the top plate 22. It is thus possible to further improve the safety of the table 1.

In the same manner, the inclined surface 264 of the right plate 26 extends from the right end side of the top plate 22 to the right end side of the bottom plate 21, and as it extends toward the right end side of the bottom plate 21, it inclines toward the inside of the housing portion 2. When seen along the up-down direction, at least a part of the inclined surface 264 is aligned with at least a part of the opening window 22A in the left-right direction. With this configuration, when the user sits at the table 1 from the right plate 26 side, the user's chest or abdomen faces the inclined surface 264. Therefore, in the same manner as described above, it is possible to further improve the safety of the table 1.

The front-rear direction is the long side direction of the housing portion 2. The left-right direction is the short side direction of the housing portion 2. The bottom plate 21 has a rectangular shape that extends in the front-rear direction and the left-right direction. The top plate 22 has a rectangular shape that extends in the front-rear direction and the left-right direction, and extends further to both sides in the left-right direction than the bottom plate 21. The inclined surface 254 extends from the left end side of the top plate 22 that extends in the front-rear direction, to the left end side of the bottom plate 21 that extends in the front-rear direction. In the same manner, the inclined surface 264 extends from the right end side of the top plate 22 that extends in the front-rear direction, to the right end side of the bottom plate 21 that extends in the front-rear direction.

With this configuration, the inclined surfaces 254 and 264 are provided on the side surfaces of the housing portion 2 in the long side direction. The side surfaces of the housing portion 2 in the long side direction allow the user to sit easily at the table 1, as compared to the side surfaces of the housing portion 2 in the short side direction. Among the plurality of side surfaces of the housing portion 2, the inclined surfaces 254 and 264 are provided on the side surfaces in the long side direction that allow the user to sit easily at the table 1. It is thus possible to improve the user-friendliness of the table 1.

When seen along the up-down direction, the main control board 64 and the power supply board 61 are disposed on opposite sides in the front-rear direction with respect to the interactive display portion 5. Since the main control board 64 and the power supply board 61 are disposed on opposite sides in the long side direction with respect to the interactive display portion 5 in this manner, the table surface 22B can be formed above the main control board 64 and above the power supply board 61. More specifically, since the table surface 22B can be formed on both sides of the opening window 22A in the long side direction, the length of the table surface 22B in the long side direction can be made large. As a result, the long side direction length of the side surfaces in the long side direction that allow the user to sit easily at the table 1 can be enlarged, and it is possible to further improve the user-friendliness of the table 1.

The present disclosure is not limited to the above-described embodiment, and various modifications are possible. For example, the interactive display portion 5 may be a touch panel display that has another structure or detection method. The shape of the housing portion 2 is not limited to that of the above-described embodiment, and, for example, the long side direction and the short side direction of the housing portion 2 may be, respectively, the left-side direction and the front-rear direction. The positions, the quantities, the shapes and the like of the electronic components (for example, the interactive display portion 5, the power supply board 61, the main control board 64, the plug receiving portion 72, the various interfaces and the like) provided in the housing portion 2 are not limited to those of the above-described embodiment and can be changed.

It is sufficient that at least one of the inclined surfaces 254 and 264 is provided. It is sufficient that, when seen along the up-down direction, at least a part of the inclined surface 254 is aligned with at least a part of the opening window 22A in the left-right direction (this also applies to the inclined surface 264). A plurality of the inclined surfaces 254 may be provided on the left plate 25 such that they are aligned in the long side direction (this also applies to the inclined surface 264). An inclined surface similar to the inclined surface 254 or the inclined surface 256 may be provided on at least one of the front plate 23 and the rear plate 24. In this case, it is sufficient that, when seen along the up-down direction, at least a part of the inclined surface is aligned with at least a part of the opening window 22A in the front-rear direction.

Figure 9:
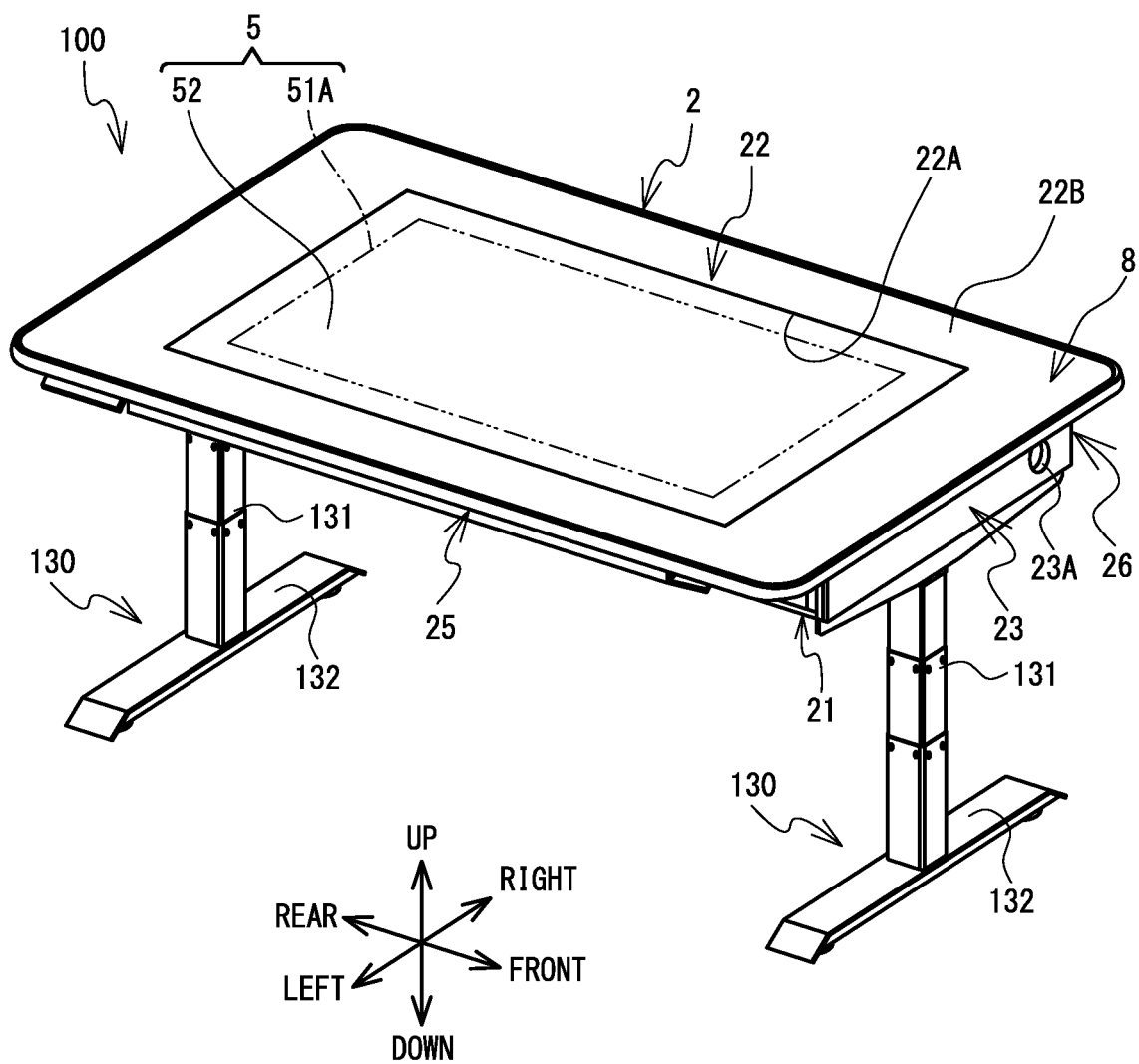
FIG. 9 is a perspective view of a table 100 according to a modified example as seen from the upper front left side.
Figure 10:
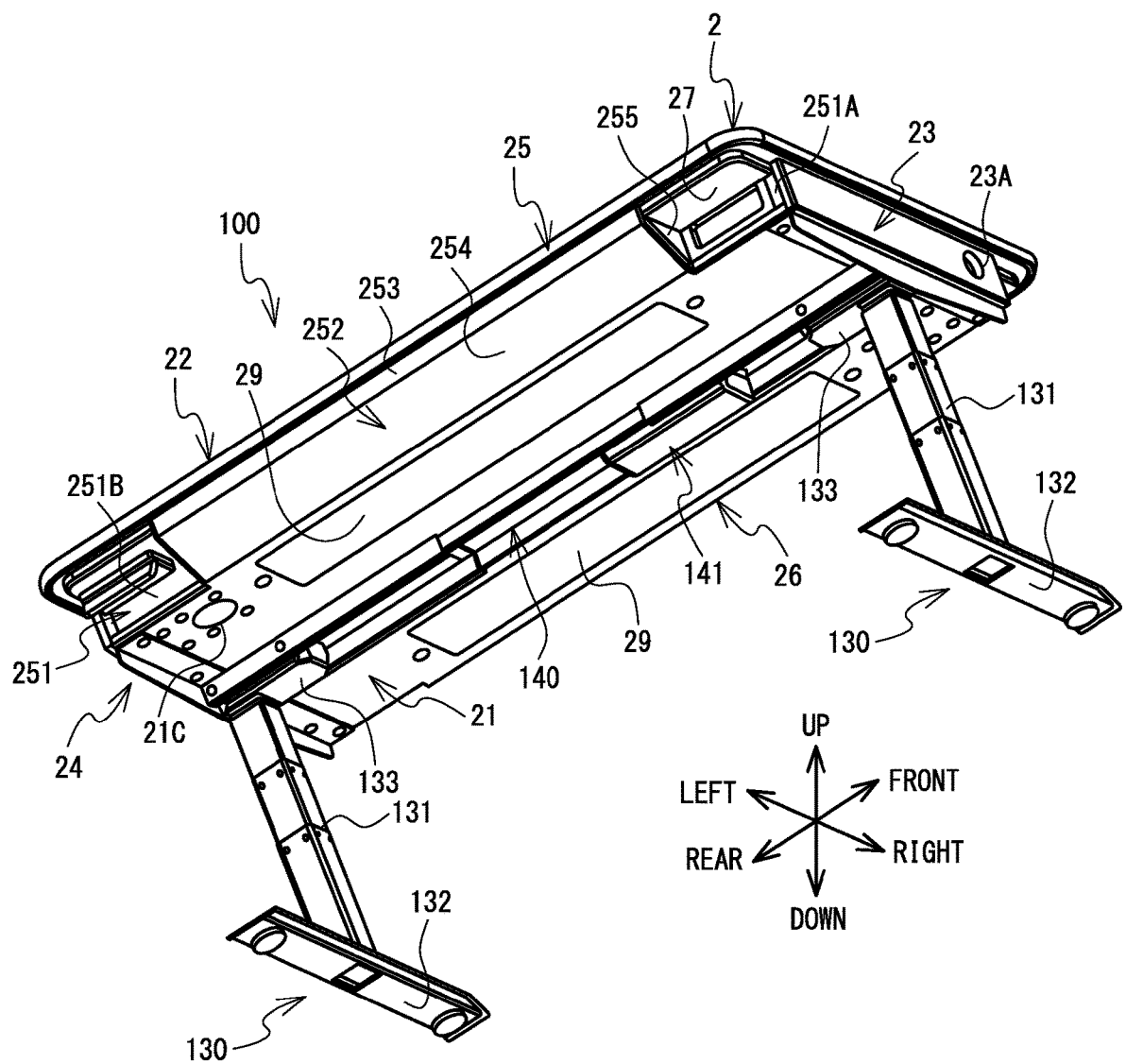
FIG. 10 is a perspective view of the table 100 according to the modified example as seen from the lower front left side.

A table 100 of a modified example will be explained with reference to FIG. 9 to FIG. 11. In the explanation below, an explanation of the same structural elements as the table 1 will be omitted and the same reference numerals will be assigned thereto, and only points different from the table 1 will be explained. As shown in FIG. 9 and FIG. 10, the table 100 has two leg portions 130 in place of the four leg portions 3 (refer to FIG. 1). The two leg portions 130 extend downward from both end portions of the housing portion 2 in the front-rear direction, and support the housing portion 2 from below. Each of the leg portions 130 is a columnar body which extends downward from a central portion of the housing portion 2 in the left-right direction and which supports the housing portion 2 from below.

Each of the leg portions 130 has a columnar portion 131, a support plate 132 and a coupling portion 133. The columnar portion 131 has a cuboid shape that extends in the up-down direction. The columnar portion 131 has a triple cylindrical structure in which an outer cylinder, an intermediate cylinder and an inner cylinder are coaxially disposed, and height adjustment can be made by moving the intermediate cylinder and the inner cylinder up and down using a built-in actuator (not shown in the drawings). The support plate 132 is provided on the lower end portion of the columnar portion 131, and is a rectangular plate-shaped member that extends in the left-right direction. The lower end portion of the columnar portion 131 is coupled to a central portion of the support plate 132 in the left-right direction. The support plate 132 is disposed on an installation surface of the table 100, and supports the table 100 on the lower side of the columnar portion 131.

The coupling portion 133 is a metal fitting for coupling that is provided on the upper end portion of the columnar portion 131. The coupling portion 133 is fixed to a coupling mechanism 140 that is provided on the lower surface of the bottom plate 21. The coupling mechanism 140 is a rail-shaped metal fitting that extends in the front-rear direction of the lower surface of the bottom plate 21, at a central portion of the bottom plate 21 in the left-right direction. The user can adjust the fixing position of the coupling portion 133 in the front-rear direction, along the coupling mechanism 140. A controller 141 that performs drive control of the aforementioned actuator is provided on the lower side of the coupling mechanism 140. The controller 141 is connected to an operation unit (not shown in the drawings) for the user to perform a raising and lowering operation of each of the leg portions 130.

Figure 11:
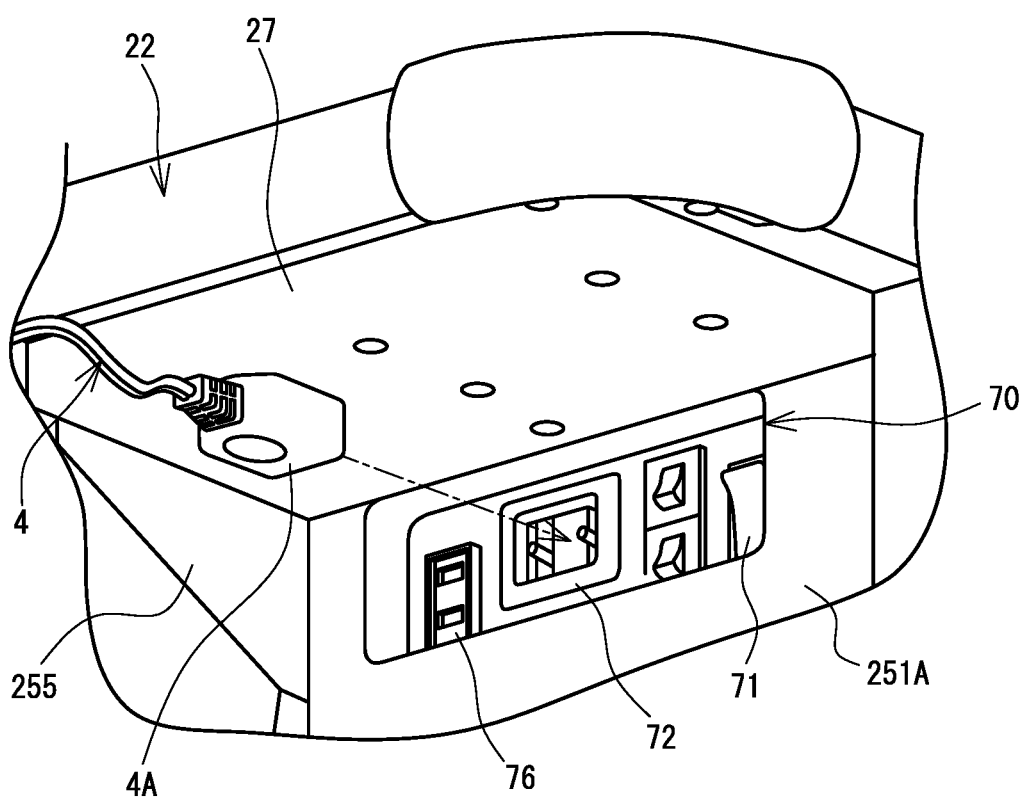
FIG. 11 is an enlarged perspective view of a first surface 251A of the table 100 according to the modified example.

As shown in FIG. 11, an interface portion 70 is provided in the first surface 251A of the table 100 of the modified example. The interface portion 70 is recessed in the rightward direction in the first surface 251A, and is a rectangular recessed portion that is long in the front-rear direction in a side view. In addition to the power supply switch 71 and the plug receiving portion 72, an outlet portion 76 is provided on the inside of the interface portion 70. The outlet portion 76 is connected to the power supply board 61 (refer to FIG. 6). An insertion plug (not shown in the drawings) of a power supply cable to supply power to the controller 141 can be attached to and detached from the outlet portion 76.

When the magnet type plug 4A of the magnet cord 4 is connected to the plug receiving portion 72 and the insertion plug of the power supply cable of the controller 141 is connected to the outlet portion 76, the power supply board 61 supplies electric power to the controller 141 also. By operating the operation unit (not shown in the drawings), the user can cause the controller 141 to raise and lower each of the leg portions 130. With this configuration, the user can freely change the height position of the housing portion 2, and the user-friendliness of the table 100 is enhanced. In this manner, with respect to the table 100 of the modified example, it is exemplified that the quantity, shape, structure and the like of the plurality of leg portions that support the housing portion 2 can be changed as appropriate, and that the table 100 may have the raising and lowering function of the housing portion 2.

Figure 14:
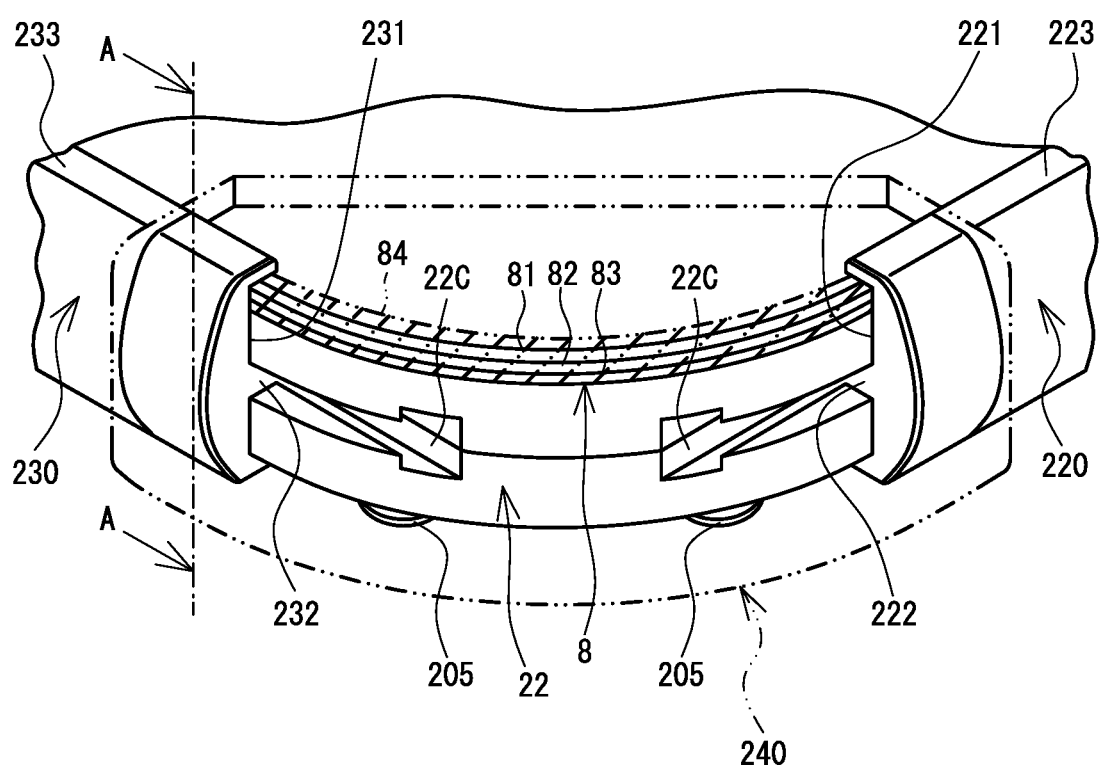
FIG. 14 is a partially enlarged view of the peripheral edge cover 210.
Figure 15:
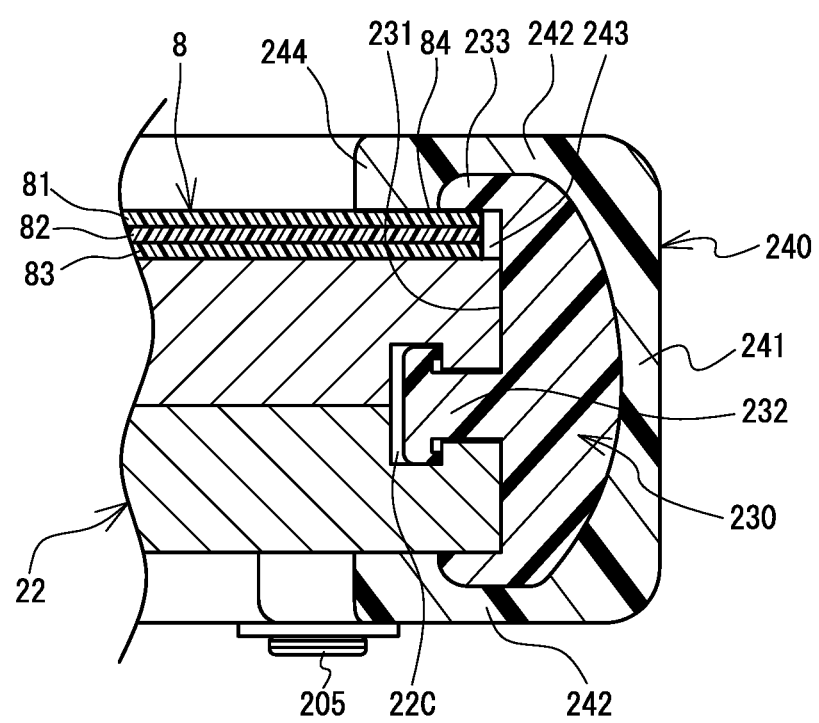
FIG. 15 is a cross-sectional view in the direction of arrows along a line A-A shown in FIG. 14.

A table 200 of a modified example will be explained with reference to FIG. 12 to FIG. 15. In the explanation below, an explanation of the same structural elements as the table 1 will be omitted and the same reference numerals will be assigned thereto, and only points different from the table 1 will be explained. In order to facilitate understanding, FIG. 13 shows the top plate 22 and a peripheral edge cover 210 whose components are developed. FIG. 14 is a perspective view when a front left corner portion of the top plate 22 is seen from diagonally above, and shows a corner cover 240 and a sealing material 84 using virtual lines. FIG. 15 is a cross-sectional view in the direction of arrows along an A-A line shown in FIG. 14.

Figure 12:
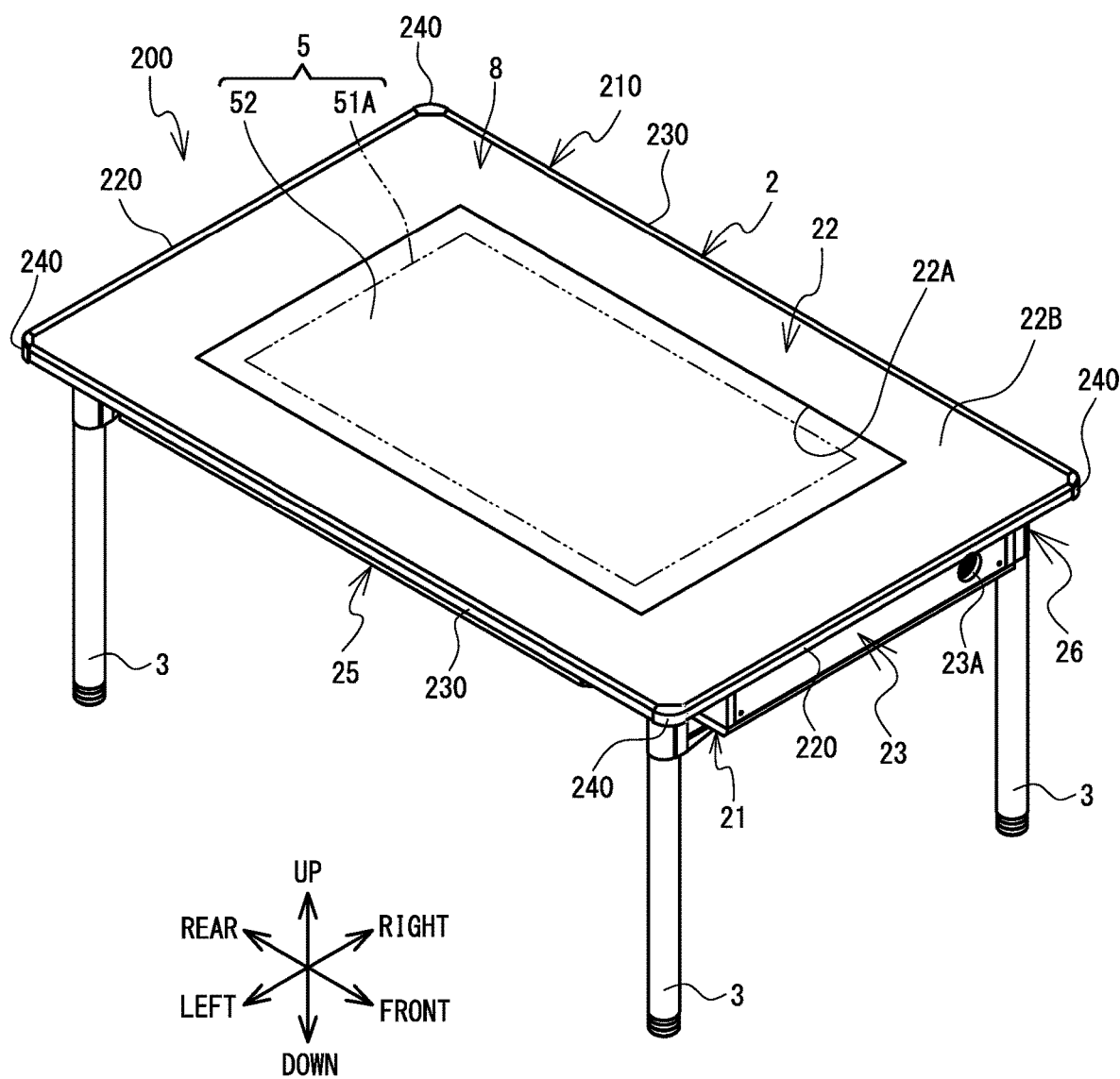
FIG. 12 is a perspective view of a table 200 according to a modified example as seen from the upper front left side.
Figure 13:
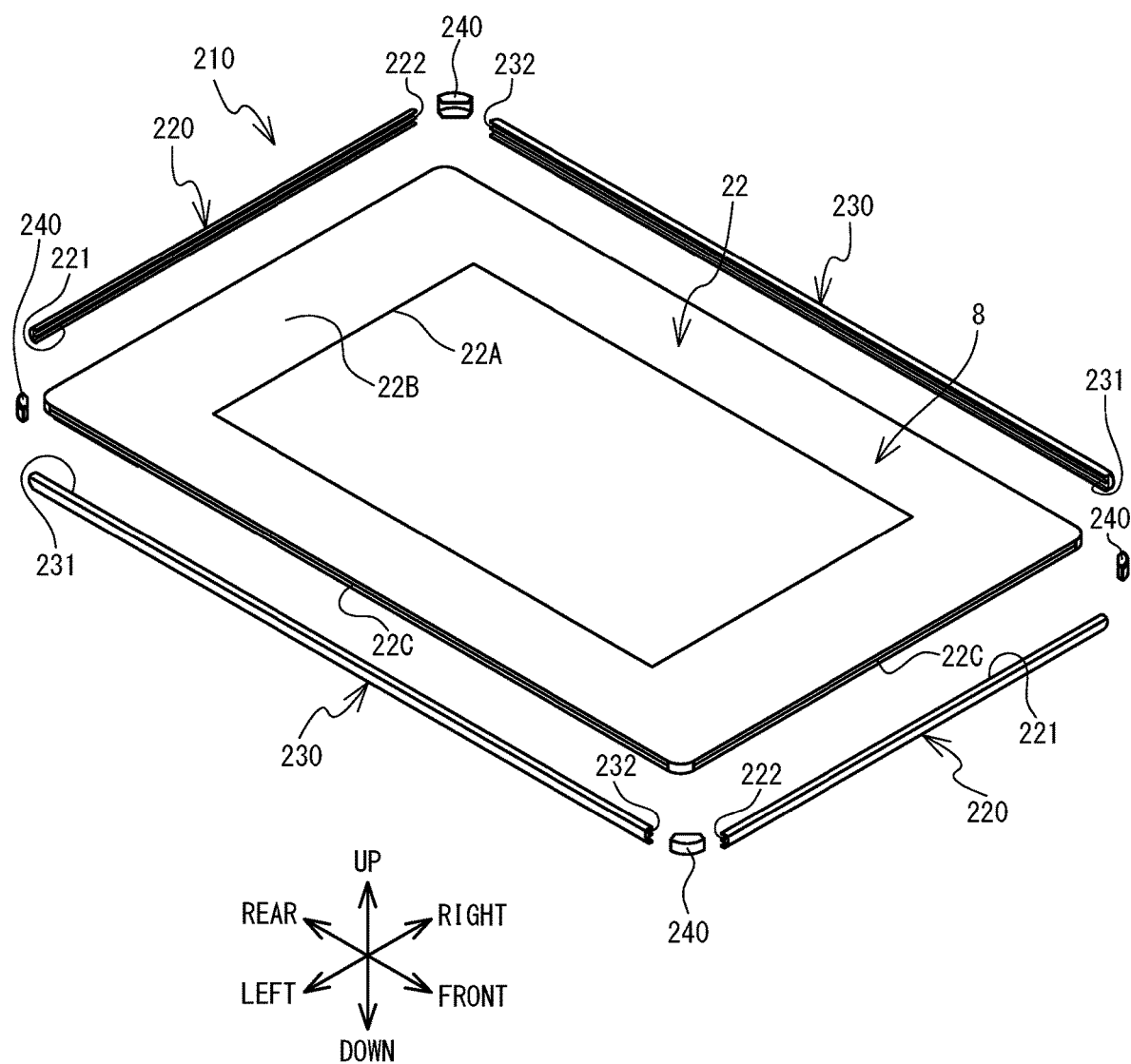
FIG. 13 is a development view of components of a peripheral edge cover 210.

As shown in FIG. 12 and FIG. 13, the table 200 is provided with the peripheral edge cover 210. The peripheral edge cover 210 is a resin member that is provided on a peripheral edge portion of the top plate 22 having the surface cover 8, and has two short side covers 220, two long side covers 230 and the four corner covers 240.

The sealing material 84 is provided on a peripheral edge portion of the surface cover 8, around the entire periphery of the surface cover 8. A material that has an excellent waterproof performance, workability and maintenance performance is suitable for the sealing material 84. A tape-shaped gasket, a paste type sealing material, a masking liquid for application and the like are used as samples, and carried out experiments to verify suitability for the sealing material 84. As a result, the tape-shaped gasket had an excellent waterproof performance, workability and maintenance performance, and was suitable for the sealing material 84.

As shown in FIG. 13 to FIG. 15, each of the short side covers 220 is a plate-shaped member that extends linearly in the left-right direction, and has a shape that protrudes in an arc shape toward an opposite side to the top plate 22. The length of each of the short side covers 220 in the left-right direction is slightly less than the length of the top plate 22 in the left-right direction. A groove portion 221 that extends in the left-right direction is formed in a surface, of each of the short side covers 220, that faces the top plate 22. The groove portion 221 is recessed in a shape corresponding to the front end portion or the rear end portion of the top plate 22. A rail-shaped engagement protrusion 222, which protrudes toward the outside of the groove portion 221 and extends in the left-right direction, is provided at a substantially central portion of the groove portion 221 in the up-down direction.

Each of the long side covers 230 has a structure similar to that of each of the short side covers 220. Each of the long side covers 230 is a plate-shaped member that extends linearly in the front-rear direction, and has a shape that protrudes in an arc shape toward the opposite side to the top plate 22. The length of each of the long side covers 230 in the front-rear direction is greater than the length of each of the short side covers 220 in the left-right direction, and is slightly less than the length of the top plate 22 in the front-rear direction. A groove portion 231 of each of the long side covers 230 is recessed in a shape corresponding to the left end portion or the right end portion of the top plate 22. A rail-shaped engagement protrusion 232, which protrudes toward the outside of the groove portion 231 and extends in the front-rear direction, is provided at a substantially central portion of the groove portion 231 in the up-down direction.

Each of the corner covers 240 is a plate-shaped member having a shape corresponding to the corner portion of the top plate 22, and has a first surface 241 and a pair of second surfaces 242. The first surface 241 extends while curving in an arc shape in a direction orthogonal to the up-down direction. The pair of second surfaces 242 are disposed facing each other on both end portions of the first surface 241 in the up-down direction, and have a substantially fan shape in a plan view. A region surrounded by the first surface 241 and the pair of second surfaces 242 is an accommodation portion 243. The accommodation portion 243 is a space that can accommodate the corner portion of the top plate 22, an end portion of the short side cover 220 and an end portion of the long side cover 230.

In the present embodiment, an engagement groove 22C that is recessed to the inside of the top plate 22 is provided in each of the four side surfaces of the top plate 22. Each of the engagement grooves 22C extends in the long side direction of the corresponding side surface, at a substantially central portion in the up-down direction of the corresponding side surface of the top plate 22. The cross-sectional shape of each of the engagement grooves 22C corresponds to the projecting shape of the engagement protrusions 222 and 232.

The two short side covers 220 are attached to the front end portion and the rear end portion of the top plate 22. Specifically, the short side cover 220 on the front side is mounted on the front end portion of the top plate 22 such that the engagement protrusion 222 is slidingly inserted into the engagement groove 22C in the front surface of the top plate 22 from the left side or the right side. At this time, the sealing material 84 is fixed from both the upper side and the lower side, between an upper protrusion 223 of the short side cover 220 on the front side and the surface cover 8 of the top plate 22 disposed in the groove portion 221. Using a similar technique, the short side cover 220 on the rear side is mounted on the rear end portion of the top plate 22.

The two long side covers 230 are attached to the left end portion and the right end portion of the top plate 22. Specifically, the long side cover 230 on the left side is mounted on the left end portion of the top plate 22 such that the engagement protrusion 232 is slidingly inserted into the engagement groove 22C in the left surface of the top plate 22 from the front side or the rear side. At this time, the sealing material 84 is fixed from both the upper side and the lower side, between an upper protrusion 233 of the long side cover 230 on the left side and the surface cover 8 of the top plate 22 disposed in the groove portion 231. Using a similar technique, the long side cover 230 on the right side is mounted on the right end portion of the top plate 22.

As shown in FIG. 14 and FIG. 15, after the two short side covers 220 and the two long side covers 230 are mounted on the top plate 22, the four corner covers 240 are mounted on the top plate 22 in the following manner. Each of the corner covers 240 is put on the corresponding corner portion of the top plate 22 such that the corner portions of the top plate 22 are accommodated in the accommodation portion 243. At this time, one end portion of the short side cover 220 and one end portion of the long side cover 230 that are in the vicinity of the corresponding corner portion of the top plate 22 are accommodated in the accommodation portion 243. The sealing material 84 is fixed from both the upper side and the lower side between an upper protrusion 244 of each of the corner covers 240 and the surface cover 8 of the top plate 22 disposed in the accommodation portion 243. After that, a plurality of screws 205 are inserted into a plurality of screw holes (not shown in the drawings) provided in the second surface 242 on the lower side. The respective corner covers 240 are fixed to the top plate 22 using the plurality of screws 205.

As exemplified by the table 200 of the modified example, the structure and the shape of the housing portion 2 can be changed as appropriate. According to the table 200, the peripheral edge portion of the top plate 22 is covered by the rounded peripheral edge cover 210. Therefore, there is no risk that the user sitting at the table 200 comes into direct contact with the peripheral edge portion of the top plate 22, and it is possible to improve the safety of the table 200. Further, the sealing material 84 is disposed around the entire periphery of the top plate 22, between the peripheral edge cover 210 and the surface cover 8. Thus, for example, when a liquid spills on the top plate 22, the liquid is inhibited from flowing between the peripheral edge cover 210 and the surface cover 8.

Figure 16:
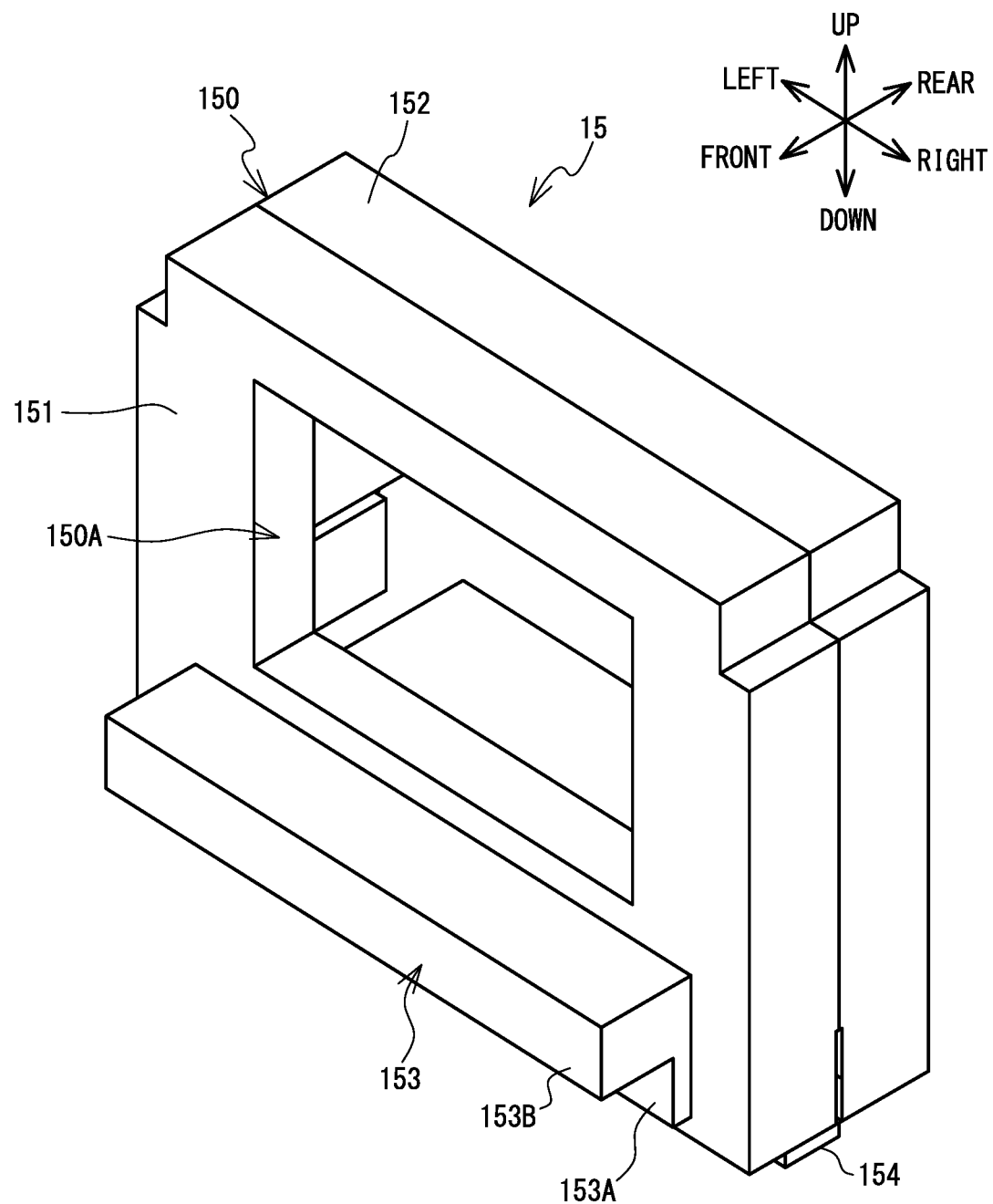
FIG. 16 is a perspective view of a plug holder 15 as seen from the upper front right side.

Note that a member that inhibits the magnet type plug 4A of the magnet cord 4 from disengaging from the plug receiving portion 72 may be used in at least one of the above-described tables 1, 100 and 200. As an example of this, a plug holder 15 will be explained with reference to FIG. 16 to FIG. 19. In the explanation below, the upper side, the lower side, the lower left side, the upper right side, the upper left side and the lower right side in FIG. 16 are respectively defined as the upper side, the lower side, the front side, the rear side, the left side and the right side of the plug holder 15. The plug holder 15 of the present example is configured to be usable in the table 100 (refer to FIG. 9 to FIG. 11).

As shown in FIG. 16, the plug holder 15 includes a plate-shaped main body 150, a tab portion 153 and a movable plate 154. The plate-shaped main body 150 is formed by a front plate 151 and a rear plate 152, which are two plate-shaped members, being overlapped and bonded with each other in the front-rear direction. The plate-shaped main body 150 has a cuboid shape that forms a main body of the plug holder 15, and has a rectangular shape that is long in the left-right direction in a front view. The up-down direction length of the plate-shaped main body 150 is the same as the up-down direction length of the recessed portion in the interface portion 70 (refer to FIG. 11). The front-rear direction length (namely, the thickness) of the plate-shaped main body 150 is substantially the same as the left-right direction length of the recessed portion (namely, the depth of the recessed portion) in the interface portion 70.

A mounting port 150A that penetrates the plate-shaped main body 150 in the front-rear direction is formed slightly above the center of the plate-shaped main body 150 in a front view. The front plate 151 and the rear plate 152 have peripheral walls that surround the mounting port 150A from the up, down, left and right directions. The mounting port 150A has a rectangular shape that is long in the left-right direction in a front view. The shape of the mounting port 150A in a front view is a shape corresponding to a vertical cross section of the magnet type plug 4A (refer to FIG. 11), and is slightly larger than the vertical cross section of the magnet type plug 4A. The magnet type plug 4A can be inserted into and removed from the mounting port 150A.

The tab portion 153 is provided on the front surface of the front plate 151, below the mounting port 150A. The tab portion 153 includes a base portion 153A and a protruding portion 153B. The base portion 153A extends in the left-right direction along the front surface of the front plate 151. The protruding portion 153B extends in the left-right direction along an upper portion of the base portion 153A, and protrudes forward from the base portion 153A. That is, the tab portion 153 is a plate-shaped member having a substantially L shape in a side view.

A slit (not shown in the drawings), which extends from the vicinity of the left end portion of the plate-shaped main body 150 to the vicinity of the right end portion, is formed in the lower end face of the plate-shaped main body 150. This slit is communicated with the interior of the plate-shaped main body 150. The movable plate 154 is a thin flat plate that is disposed inside the slit and that is long in the left-right direction in a front view. A coupling opening (not shown in the drawings) is provided in the front plate 151, to the rear of the base portion 153A. The back surface of the base portion 153A is provided with a plate-shaped coupling protrusion (not shown in the drawings) that is disposed inside the coupling opening. The coupling protrusion of the base portion 153A is coupled to the front surface of the movable plate 154. The movable plate 154 can move up and down in conjunction with the base portion 153A, in a range in which the coupling protrusion of the base portion 153A can move inside the coupling opening.

Figure 17:
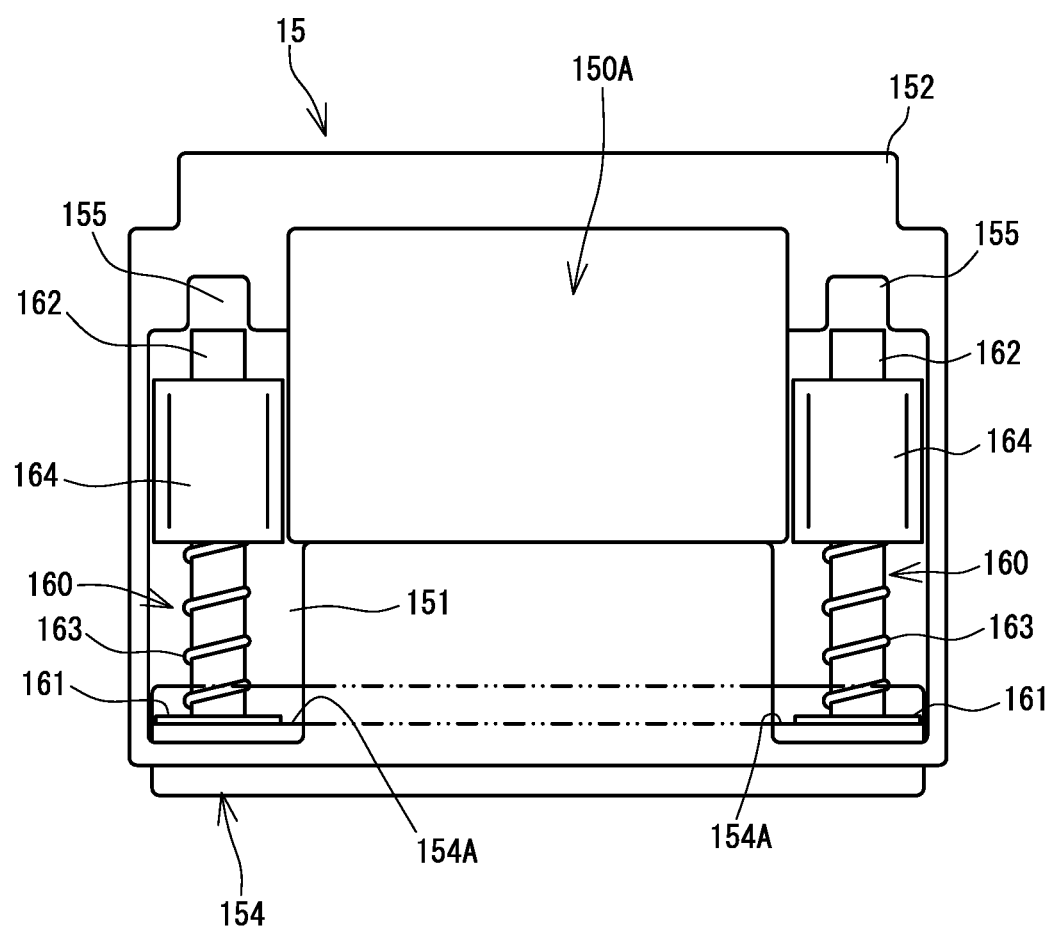
FIG. 17 is a back view of the plug holder 15.
Figure 18:
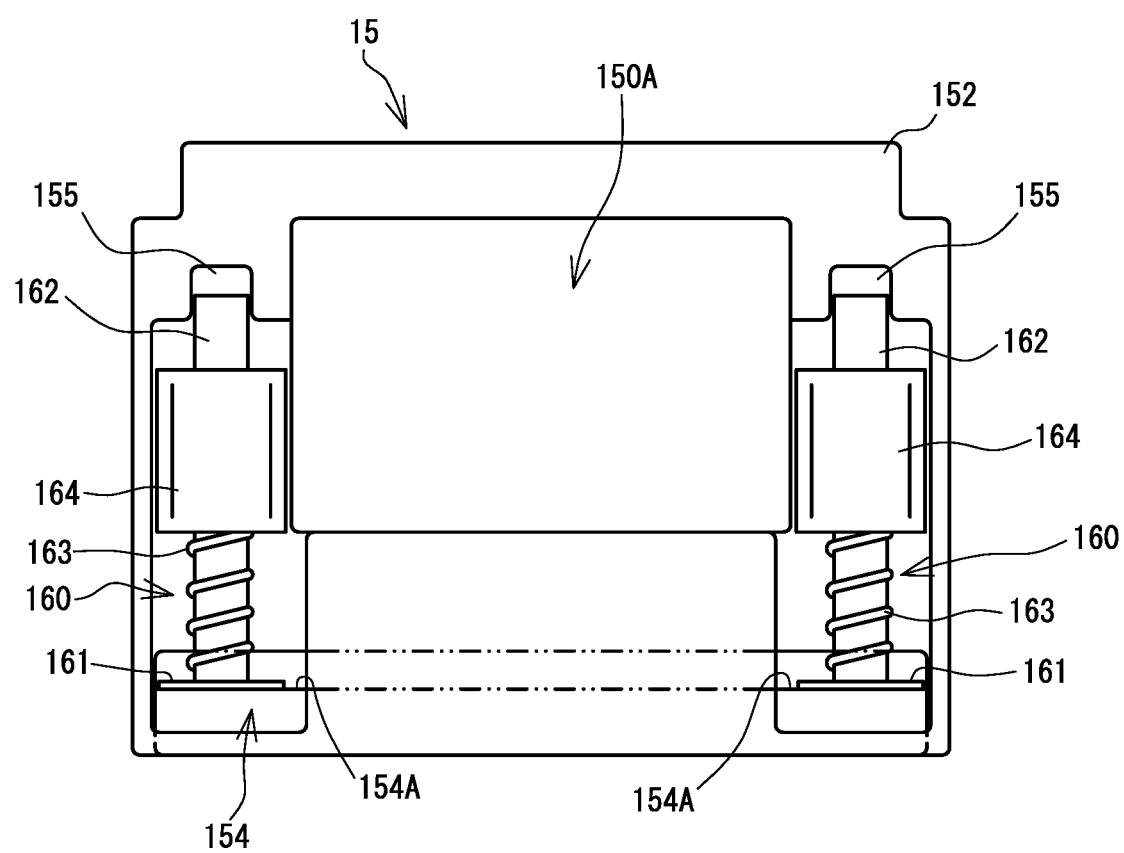
FIG. 18 is another back view of the plug holder 15.

As shown in FIG. 17 and FIG. 18, a pair of left and right spring arrangement portions 155 are formed on the back surface side of the plate-shaped main body 150. The pair of left and right spring arrangement portions 155 are located on the lower right side and the lower left side of the mounting port 150A in the plate-shaped main body 150, in a back view. Each of the spring arrangement portions 155 is a recessed section which is surrounded by the rear surface of the front plate 151 and side walls of the rear plate 152 and which is recessed forward from the rear surface of the plate-shaped main body 150. Each of the spring arrangement portions 155 is communicated with the aforementioned slit in the up-down direction.

A pair of left and right spring units 160 are disposed in the pair of left and right spring arrangement portions 155. Each of the spring units 160 includes a head portion 161, a shaft portion 162, a coil spring 163 and a spring holding member 164. A rear portion of the upper end portion of the movable plate 154 includes a stepped surface 154A that is recessed downward in a stepwise manner. The head portion 161 has a dish shape that extends in the horizontal direction, and is placed on the stepped surface 154A. The shaft portion 162 is a shaft body that extends upward from the center of the head portion 161 in a plan view. The spring holding member 164 is provided above the head portion 161. The spring holding member 164 extends rearward from the rear surface of the front plate 151, and has a cylindrical shape that surrounds the outer peripheral side of the shaft portion 162. The coil spring 163 is wound around the outer peripheral surface of the shaft portion 162, between the head portion 161 and the spring holding member 164. The coil spring 163 is compressed and held from both the upper side and the lower side by the head portion 161 and the spring holding member 164.

As shown in FIG. 17, in a state in which an outer force is not applied to the plug holder 15, the movable plate 154 moves downward as a result of the head portion 161 being urged downward by an elastic force of the coil spring 163. In accordance with this, the tab portion 153 also moves downward until the coupling protrusion of the base portion 153A reaches the lower end portion inside the coupling opening. As a result, the plug holder 15 is held in an advanced state in which a lower portion of the movable plate 154 protrudes downward from the plate-shaped main body 150.

As shown in FIG. 18, for example, when the user pushes up the tab portion 153, the movable plate 154 moves upward against the elastic force of the coil spring 163. At this time, the head portion 161 moves upward while compressing and urging the coil spring 163 against the spring holding member 164. The shaft portion 162 that is pushed up by the head portion 161 is guided upward by the spring holding member 164. As a result, the plug holder 15 is brought into a retracted state in which the whole of the movable plate 154 is disposed inside the plate-shaped main body 150.

Figure 19:
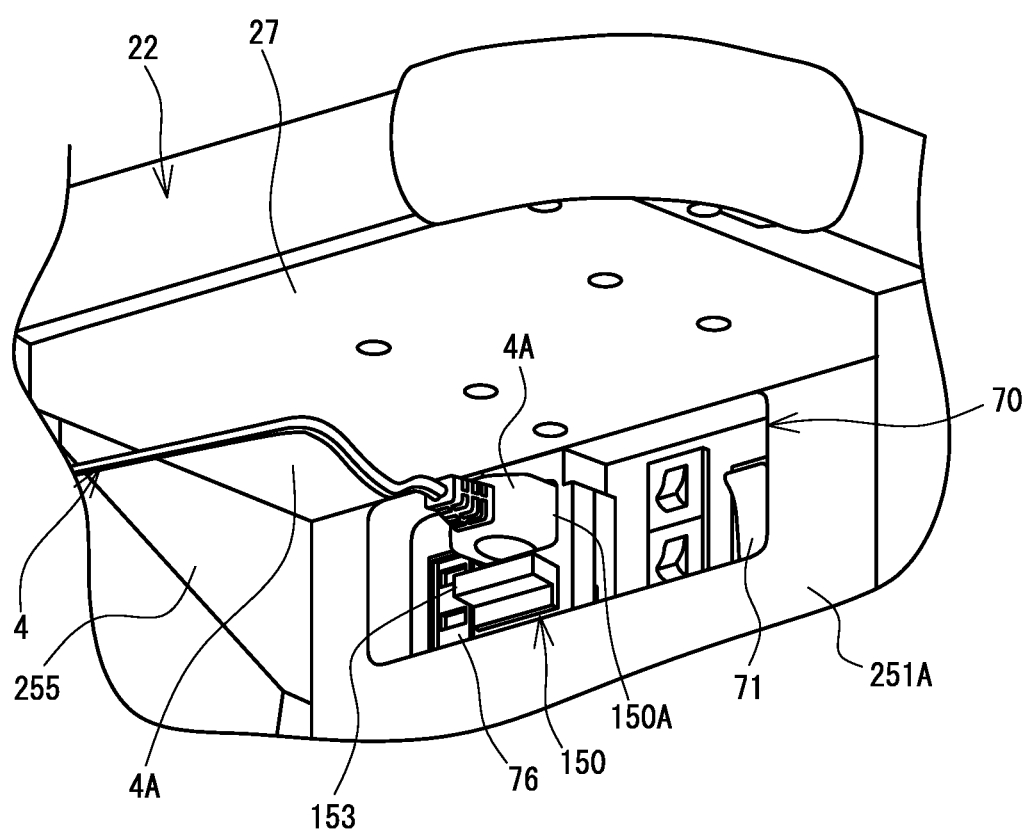
FIG. 19 is an enlarged perspective view of the first surface 251A, which shows a use mode of the plug holder 15.

As shown in FIG. 19, when the user uses the plug holder 15, the user mounts the plug holder 15 in the interface portion 70. Specifically, while holding the plug holder 15 in the retracted state by pressing up the tab portion 153 using a finger, the user inserts the plug holder 15 into the interface portion 70. Further, the user positions the plug holder 15 inside the interface portion 70 such that the plug receiving portion 72 (refer to FIG. 11) faces the mounting port 150A. After that, when the user removes his/her finger from the tab portion 153, the movable plate 154 is urged downward by the elastic force of the coil spring 163. The plug holder 15 is reliably fixed inside the interface portion 70 by the movable plate 154 that protrudes from the plate-shaped main body 150.

Next, the user inserts the magnet type plug 4A of the magnet cord 4 into the mounting port 150A, and thereby connects it to the plug receiving portion 72. The magnet type plug 4A connected to the plug receiving portion 72 inside the mounting port 150A is supported by the peripheral walls of the plate-shaped main body 150 that surround the mounting port 150A, from directions orthogonal to an attachment/detachment direction of the magnet type plug 4A. Thus, the magnet type plug 4A is unlikely to be detached from the plug receiving portion 72, in comparison to when the plug holder 15 is not used.

All elements (for example, an interactive display portion, a control portion, a power supply portion, a plug receiving portion and the like) described in the claims, the specification and the drawings may be physically singular or plural as long as there is no clear description that intentionally limits the number thereof, and an arrangement may be changed as appropriate. Further, the names (element names) assigned to the above-described elements are merely assigned for the sake of convenience for the description of this application, and are not particularly intended to generate any special meaning thereby. Therefore, the nature of the element should not be interpreted in a limited manner simply by the element name. For example, the "control portion" and the like may be a single piece of hardware or may be hardware including software. Further, whether to configure a plurality of elements, among all the above-described elements, integrally as appropriate, or whether to configure one element by dividing it into a plurality of elements is a matter that can be easily conceived by those skilled in the art, and it is apparent that either pattern is within an assumed range, without having to intentionally describe all patterns thereof in the specification and the like. It therefore goes without saying that all such patterns are included in the scope of rights of the present disclosure insofar as there is no description clearly eliminating them from the scope of the claims and the like. Therefore, simply adopting a difference in configuration with respect to another interactive table within such a range as that described above does not constitute exemption from the rights of the present disclosure on the grounds of there being no description in the present embodiment. In addition, this also applies to any evident range of difference, in the configuration, the shape and the like of each element, that can be easily conceived from the present embodiment by those skilled in the art.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A touch panel display-mounted table comprising:
a housing portion having a bottom plate, a top plate disposed above the bottom plate and a plurality of side plates that couple the bottom plate and the top plate, and having a box shape inside which an accommodation space is formed, the housing portion extending in a first direction orthogonal to an up-down direction in which the bottom plate and the top plate face each other, and in a second direction orthogonal to the up-down direction and the first direction;
a plurality of leg portions that support the housing portion from below;
an interactive display portion disposed in the accommodation space and having an interactive surface on which information is displayed and a touch operation of a user is performed;
an opening window which is an opening formed in the top plate and which causes substantially the whole of the interactive surface to be exposed above the top plate;
a control portion disposed in the accommodation space and connected to the interactive display portion, the control portion controlling at least the interactive display portion;
a power supply portion disposed in the accommodation space and connected to the interactive display portion and the control portion, the power supply portion supplying power to the interactive display portion and the control portion; and
a plug receiving portion which is provided on one of the plurality of side plates and is connected to the power supply portion, and to which a magnet type plug of a magnet cord connectable to an external power supply is connected, using an attraction force of a magnet, wherein
the plurality of side plates include two first side plates which extend in the first direction and face each other in the second direction, and two second side plates which extend in the second direction and face each other in the first direction,
at least one of the two first side plates includes an inclined surface that extends in a direction that intersects the up-down direction,
the inclined surface extends from an end side of the top plate to an end side of the bottom plate, and inclines toward the inside of the housing portion as the inclined surface extends toward the end side of the bottom plate,
at least a part of the inclined surface is aligned with at least a part of the opening window in the second direction when seen along the up-down direction,
the first direction is a long side direction of the housing portion,
the second direction is a short side direction of the housing portion,
the bottom plate has a rectangular shape that extends in the first direction and the second direction,
the top plate has a rectangular shape that extends in the first direction and the second direction, and extends further to both sides in the second direction than the bottom plate,
the inclined surface extends from the end side of the top plate that extends in the first direction to the end side of the bottom plate that extends in the first direction, and
the control portion and the power supply portion are disposed on opposite sides in the first direction with respect to the interactive display portion when seen along the up-down direction.

* * * * *